(12) United States Patent
Leafblad et al.

(10) Patent No.: US 11,453,844 B2
(45) Date of Patent: Sep. 27, 2022

(54) COMPOSITIONS AND METHOD FOR FLOOR CLEANING OR RESTORATION

(71) Applicant: Ecolab USA Inc., St. Paul, MN (US)

(72) Inventors: Brian Robert Leafblad, Inver Grove Heights, MN (US); Grant Daniel Lindh, South St. Paul, MN (US); Avila M. Hoffman, Minneapolis, MN (US); Traci Lynn Gioino, Maplewood, MN (US); Dale Curtis Larson, Eagan, MN (US)

(73) Assignee: ECOLAB USA INC., St. Paul, MN (US)

( * ) Notice: Subject to any disclaimer, the term of this patent is extended or adjusted under 35 U.S.C. 154(b) by 0 days.

(21) Appl. No.: 16/991,433

(22) Filed: Aug. 12, 2020

(65) Prior Publication Data

US 2021/0024854 A1    Jan. 28, 2021

Related U.S. Application Data

(62) Division of application No. 15/969,015, filed on May 2, 2018, now Pat. No. 10,774,292.

(Continued)

(51) Int. Cl.
| | |
|---|---|
| *C11D 1/72* | (2006.01) |
| *C11D 3/37* | (2006.01) |
| *C09G 1/04* | (2006.01) |
| *C09G 1/08* | (2006.01) |
| *C09G 1/10* | (2006.01) |

(Continued)

(52) U.S. Cl.
CPC .............. *C11D 3/3757* (2013.01); *C09G 1/10* (2013.01); *C09G 1/12* (2013.01); *C11D 1/004* (2013.01); *C11D 1/72* (2013.01); *C11D 3/2068* (2013.01); *C11D 3/373* (2013.01); *C11D 3/3749* (2013.01); *C11D 11/0023* (2013.01); *C11D 11/0058* (2013.01)

(58) Field of Classification Search
CPC ......... C11D 1/72; C11D 3/162; C11D 3/2068; C11D 3/245; C11D 3/37; C09G 1/04; C09G 1/08; C09G 1/10
See application file for complete search history.

(56) References Cited

U.S. PATENT DOCUMENTS

| | | |
|---|---|---|
| 3,956,779 A | 5/1976 | Jewett |
| 3,979,487 A | 9/1976 | Squier et al. |

(Continued)

FOREIGN PATENT DOCUMENTS

| | | |
|---|---|---|
| EP | 0 122 788 | 10/1984 |
| EP | 2 679 663 | 1/2014 |

(Continued)

OTHER PUBLICATIONS

International Search Report and Written Opinion for Application No. PCT/US2018/030658 dated Jul. 17, 2018.

*Primary Examiner* — Brian P Mruk
(74) *Attorney, Agent, or Firm* — Merchant & Gould P.C.

(57) ABSTRACT

The present disclosure relates to compositions and methods of using the compositions for treating a floor surface. The disclosed compositions clean the floor surface, repair damage, or maintain the original look of the floor. The disclosed compositions also do not provide a permanent finish on the floor, are temporary coatings, or do not significantly change the gloss of the floor after application.

17 Claims, 1 Drawing Sheet

Related U.S. Application Data

(60) Provisional application No. 62/504,869, filed on May 11, 2017.

(51) Int. Cl.
| | |
|---|---|
| *C09G 1/12* | (2006.01) |
| *C11D 3/20* | (2006.01) |
| *C11D 11/00* | (2006.01) |
| *C11D 1/00* | (2006.01) |

(56) References Cited

U.S. PATENT DOCUMENTS

| | | |
|---|---|---|
| 4,082,854 A | 4/1978 | Yamada et al. |
| 4,172,064 A | 10/1979 | Keeler |
| 4,278,728 A | 7/1981 | Honda et al. |
| 4,376,175 A | 3/1983 | Posten |
| 4,393,166 A | 6/1983 | Reischl et al. |
| 4,449,764 A | 5/1984 | Hastings |
| 4,454,259 A | 6/1984 | Reischl et al. |
| 4,589,712 A | 5/1986 | Hastings |
| 4,674,745 A | 6/1987 | Speranza |
| 4,692,364 A | 9/1987 | Altus |
| 4,784,908 A | 1/1988 | Ungar et al. |
| 4,725,319 A | 2/1988 | Osberghaus |
| 4,835,030 A | 10/1989 | Squier et al. |
| 5,030,488 A | 7/1991 | Sobolev |
| 5,041,696 A | 8/1991 | Utner |
| 5,062,913 A | 11/1991 | Owens et al. |
| 5,093,958 A | 3/1992 | Levine |
| 5,111,627 A | 5/1992 | Brown |
| 5,208,086 A | 5/1993 | Owens |
| 5,219,629 A | 6/1993 | Sobolev |
| 5,244,721 A | 9/1993 | Wyche et al. |
| 5,254,798 A | 10/1993 | Zoback |
| 5,257,159 A | 10/1993 | Wallace et al. |
| 5,271,200 A | 12/1993 | Witt |
| 5,314,554 A | 5/1994 | Owens |
| 5,317,476 A | 5/1994 | Wallace et al. |
| 5,509,715 A | 4/1996 | Scharpf |
| 5,573,088 A | 11/1996 | Daniels |
| 5,596,912 A | 1/1997 | Laurence et al. |
| 5,645,279 A | 7/1997 | Reutlinger |
| 5,653,494 A | 8/1997 | Cleall et al. |
| 5,749,993 A | 5/1998 | Denney et al. |
| 5,753,604 A | 5/1998 | Soldanski et al. |
| 5,830,937 A | 11/1998 | Shalov et al. |
| 5,858,521 A | 1/1999 | Okuda et al. |
| 5,891,564 A | 4/1999 | Shultz et al. |
| 6,079,182 A | 6/2000 | Ellenberger |
| 6,090,437 A | 7/2000 | Rafter |
| 6,126,132 A | 10/2000 | Maue |
| 6,131,983 A | 10/2000 | Jackson |
| 6,182,128 B1 | 1/2001 | Kelkar et al. |
| 6,230,418 B1 | 5/2001 | Gomulinski |
| 6,287,681 B1 | 9/2001 | Mehta et al. |
| 6,324,809 B1 | 12/2001 | Nelson |
| 6,345,481 B1 | 2/2002 | Nelson |
| 6,413,618 B1 | 7/2002 | Parker et al. |
| 6,449,918 B1 | 9/2002 | Nelson |
| 6,460,306 B1 | 10/2002 | Nelson |
| 6,485,094 B2 | 11/2002 | Corder et al. |
| 6,536,178 B1 | 3/2003 | Palsson et al. |
| 6,586,080 B1 | 7/2003 | Heifetz |
| 6,625,937 B1 | 9/2003 | Parker et al. |
| 6,627,704 B2 | 9/2003 | Yeager et al. |
| 6,672,638 B2 | 1/2004 | Corder et al. |
| 6,673,097 B1 | 1/2004 | Venuto, Sr. |
| 6,685,388 B2 | 2/2004 | Webster et al. |
| 6,746,756 B2 | 6/2004 | Simon et al. |
| 6,759,105 B2 | 7/2004 | Brooker et al. |
| 6,762,162 B1 * | 7/2004 | Valpey, III .............. C11D 3/48 510/214 |
| 6,767,630 B2 | 7/2004 | Okuyama |
| 6,769,217 B2 | 8/2004 | Nelson |
| 6,804,923 B1 | 10/2004 | Potter |
| 6,812,276 B2 | 11/2004 | Yeager |
| 6,863,768 B2 | 3/2005 | Haffner et al. |
| 6,921,886 B2 | 6/2005 | Holzer et al. |
| 6,949,274 B2 | 9/2005 | Nelson et al. |
| 6,966,161 B2 | 11/2005 | Palsson et al. |
| 7,008,990 B2 | 3/2006 | Raether et al. |
| 7,013,609 B2 | 3/2006 | Hydock |
| 7,045,706 B1 | 5/2006 | Lincoln, III et al. |
| 7,045,750 B2 | 5/2006 | Holzer et al. |
| 7,098,178 B2 | 8/2006 | Gerke et al. |
| 7,108,914 B2 | 9/2006 | Skipor et al. |
| 7,141,767 B2 | 11/2006 | Holzer et al. |
| 7,144,544 B2 | 12/2006 | Bulluck et al. |
| 7,144,625 B2 | 12/2006 | Tunis |
| 7,146,772 B2 | 12/2006 | Ralf |
| 7,200,973 B2 | 4/2007 | Tunis |
| 7,220,948 B2 | 5/2007 | Holzer et al. |
| 7,240,951 B2 | 7/2007 | Willerton |
| 7,243,513 B2 | 7/2007 | Kohlman et al. |
| 7,246,839 B1 | 7/2007 | Nyberg |
| 7,276,542 B2 | 10/2007 | Bulluck et al. |
| 7,282,264 B2 | 10/2007 | Ddamulira et al. |
| 7,291,656 B2 | 11/2007 | Bulluck et al. |
| 7,291,657 B2 | 11/2007 | Bulluck et al. |
| 7,320,739 B2 | 1/2008 | Thompson, Jr. et al. |
| 7,377,081 B2 | 5/2008 | Ruhdorfer |
| 7,392,626 B2 | 7/2008 | Farrend |
| 7,399,515 B1 | 7/2008 | Thele |
| 7,454,874 B2 | 11/2008 | Ralf |
| 7,481,453 B2 | 1/2009 | Breed |
| 7,552,568 B2 | 6/2009 | Palsson et al. |
| 7,591,346 B2 | 9/2009 | Thompson, Jr. et al. |
| 7,597,373 B2 | 10/2009 | McAuliffe, Jr. |
| 7,614,197 B2 | 11/2009 | Nelson |
| 7,629,400 B2 | 12/2009 | Hyman |
| 7,665,272 B2 | 2/2010 | Reen |
| 7,702,113 B1 | 4/2010 | Bird |
| 7,712,199 B1 | 5/2010 | Wilson |
| 7,785,098 B1 | 8/2010 | Appleby et al. |
| 7,793,483 B2 | 9/2010 | Stanchfield et al. |
| 7,799,943 B2 | 9/2010 | Shah et al. |
| 7,810,453 B2 | 10/2010 | Craft |
| 7,811,489 B2 | 10/2010 | Pervan et al. |
| 7,811,666 B2 | 10/2010 | Dry |
| 7,861,753 B2 | 1/2011 | Walker |
| 7,884,146 B2 | 2/2011 | Yawata et al. |
| 7,886,488 B2 | 2/2011 | Payne, Jr. et al. |
| 7,893,413 B1 | 2/2011 | Appleby et al. |
| 7,897,002 B2 | 3/2011 | Bober et al. |
| 7,906,176 B2 | 3/2011 | Balthes et al. |
| 7,908,810 B2 | 3/2011 | Payne, Jr. et al. |
| 7,984,595 B2 | 7/2011 | Reen |
| 8,002,003 B2 | 8/2011 | Walker |
| 8,006,458 B1 | 8/2011 | Olofsson et al. |
| 8,012,889 B2 | 9/2011 | Balthes et al. |
| 8,021,014 B2 | 9/2011 | Jacobsson |
| 8,039,532 B2 | 10/2011 | Hanaki et al. |
| 8,049,193 B1 | 11/2011 | Appleby et al. |
| 8,071,491 B2 | 12/2011 | Balthes et al. |
| 8,092,036 B2 | 1/2012 | Jacobsson |
| 8,156,710 B1 | 4/2012 | Pien |
| 8,158,539 B2 | 4/2012 | Balthes |
| 8,172,075 B2 | 5/2012 | Krallinger |
| 8,205,577 B2 | 6/2012 | Sia et al. |
| 8,206,511 B2 | 6/2012 | Collazo-Martinez et al. |
| 8,210,126 B2 | 6/2012 | Sia et al. |
| 8,227,037 B2 | 7/2012 | Balthes et al. |
| 8,286,919 B2 | 10/2012 | Gerken et al. |
| 8,298,650 B2 | 10/2012 | Reichwein et al. |
| 8,313,121 B2 | 11/2012 | Rolfe et al. |
| 8,317,257 B2 | 11/2012 | Rolfe et al. |
| 8,342,283 B2 | 1/2013 | Rolfe et al. |
| 8,347,575 B2 | 1/2013 | Bierwirth |
| 8,349,235 B2 | 1/2013 | Pervan et al. |
| 8,360,362 B2 | 1/2013 | Kismarton et al. |
| 8,375,668 B2 | 2/2013 | Kuepfer |
| 8,382,004 B2 | 2/2013 | Asmussen et al. |
| 8,382,033 B2 | 2/2013 | Reece |

(56) References Cited

U.S. PATENT DOCUMENTS

| | | |
|---|---|---|
| 8,394,217 B2 | 3/2013 | Pien |
| 8,427,034 B2 | 4/2013 | King et al. |
| 8,429,870 B2 | 4/2013 | Chen et al. |
| 8,434,738 B1 | 5/2013 | Anstett |
| 8,475,928 B2 | 7/2013 | Arroyo-Bernal |
| 8,512,848 B2 | 8/2013 | Reichwein et al. |
| 8,529,646 B2 | 9/2013 | Eskin et al. |
| 8,585,829 B2 | 11/2013 | Li et al. |
| 8,609,884 B2 | 12/2013 | Davies et al. |
| 8,613,166 B2 | 12/2013 | Smith |
| 8,617,439 B2 | 12/2013 | Pervan et al. |
| 8,650,824 B2 | 2/2014 | DeLong et al. |
| 8,651,061 B2 | 2/2014 | Sia et al. |
| 8,697,586 B2 | 4/2014 | Balthes et al. |
| 8,703,275 B2 | 4/2014 | Reichwein et al. |
| 8,716,220 B2 | 5/2014 | Tezapsidis et al. |
| 8,720,144 B2 | 5/2014 | Keane |
| 8,721,959 B2 | 5/2014 | Dry |
| 8,726,603 B2 | 5/2014 | Huang |
| 8,729,213 B2 | 5/2014 | Raymond et al. |
| 8,734,263 B2 | 5/2014 | Ford et al. |
| 8,766,633 B2 | 7/2014 | Bhattacharya et al. |
| 8,776,698 B2 | 7/2014 | Pherson |
| 8,791,185 B2 | 7/2014 | Walther et al. |
| 8,800,245 B1 | 8/2014 | Pien |
| 8,806,832 B2 | 8/2014 | Kell |
| 8,815,370 B2 | 8/2014 | Reichwein et al. |
| 8,833,028 B2 | 9/2014 | Whispell et al. |
| 8,853,329 B2 | 10/2014 | Kasper et al. |
| 8,881,476 B2 | 11/2014 | Sullivan et al. |
| 8,931,227 B2 | 1/2015 | Keane |
| 8,932,632 B2 | 1/2015 | Yadav et al. |
| 8,974,003 B2 | 3/2015 | Reedy et al. |
| 8,985,820 B2 | 3/2015 | Mazur et al. |
| 9,023,591 B2 | 5/2015 | Battisti et al. |
| 9,066,501 B2 | 6/2015 | Sia et al. |
| 9,072,292 B2 | 7/2015 | Cavitt et al. |
| 9,079,212 B2 | 7/2015 | Pervan et al. |
| 9,103,126 B2 | 8/2015 | Kell |
| 9,109,108 B1 | 8/2015 | Ford et al. |
| 9,080,033 B2 | 9/2015 | Keane |
| 9,126,868 B2 | 9/2015 | Aberle et al. |
| 9,133,627 B2 | 9/2015 | Keane |
| 9,151,066 B1 | 10/2015 | Hilton et al. |
| 9,155,310 B2 | 10/2015 | Agrawal et al. |
| 9,161,544 B2 | 10/2015 | Agrawal et al. |
| 9,169,659 B1 | 10/2015 | Ford et al. |
| 9,181,290 B2 | 11/2015 | Liu et al. |
| 9,206,309 B2 | 12/2015 | Appleby et al. |
| 9,207,296 B2 | 12/2015 | Bhattacharya et al. |
| 9,227,507 B2 | 1/2016 | Rolfe et al. |
| 9,233,422 B2 | 1/2016 | Harden et al. |
| 9,248,468 B2 | 2/2016 | Bulluck |
| 9,249,582 B1 | 2/2016 | Anspach et al. |
| 9,260,870 B2 | 2/2016 | Vermeulen et al. |
| 9,278,478 B2 | 3/2016 | Goad |
| 9,279,058 B2 | 3/2016 | Pervan et al. |
| 9,290,680 B2 | 3/2016 | Kasper et al. |
| 9,290,936 B2 | 3/2016 | Dickey et al. |
| 9,303,403 B2 | 4/2016 | Bolin |
| 9,309,183 B2 | 4/2016 | Storzum et al. |
| 9,314,936 B2 | 4/2016 | Pervan |
| 9,315,663 B2 | 4/2016 | Appleby et al. |
| 9,321,925 B2 | 4/2016 | Pervan et al. |
| 9,347,227 B2 | 5/2016 | Ramachandra et al. |
| 9,358,754 B2 | 6/2016 | Anspach et al. |
| 9,371,435 B2 | 6/2016 | Palmer, Jr. et al. |
| 9,371,456 B2 | 6/2016 | Pervan et al. |
| 9,375,750 B2 | 6/2016 | Reenberg et al. |
| 9,394,701 B2 | 7/2016 | Ddamulira et al. |
| 9,399,865 B2 | 7/2016 | Hubbard et al. |
| 9,409,382 B2 | 8/2016 | Hakansson et al. |
| 9,415,565 B2 | 8/2016 | Ford et al. |
| 9,487,947 B2 | 11/2016 | Matsukawa et al. |
| 9,506,256 B2 | 11/2016 | Thiers |
| 9,528,011 B2 | 12/2016 | Pervan et al. |
| 9,540,825 B2 | 1/2017 | Ramachandra |
| 9,556,620 B2 | 9/2017 | Capelle |
| 2016/0185997 A1 | 6/2016 | Gaston |

FOREIGN PATENT DOCUMENTS

| | | |
|---|---|---|
| GB | 1 528 592 | 10/1978 |
| JP | 2001-131495 | 5/2001 |
| WO | WO 94/20595 | 9/1994 |
| WO | WO 02/070618 | 9/2002 |
| WO | WO 2017/152069 | 9/2017 |

\* cited by examiner

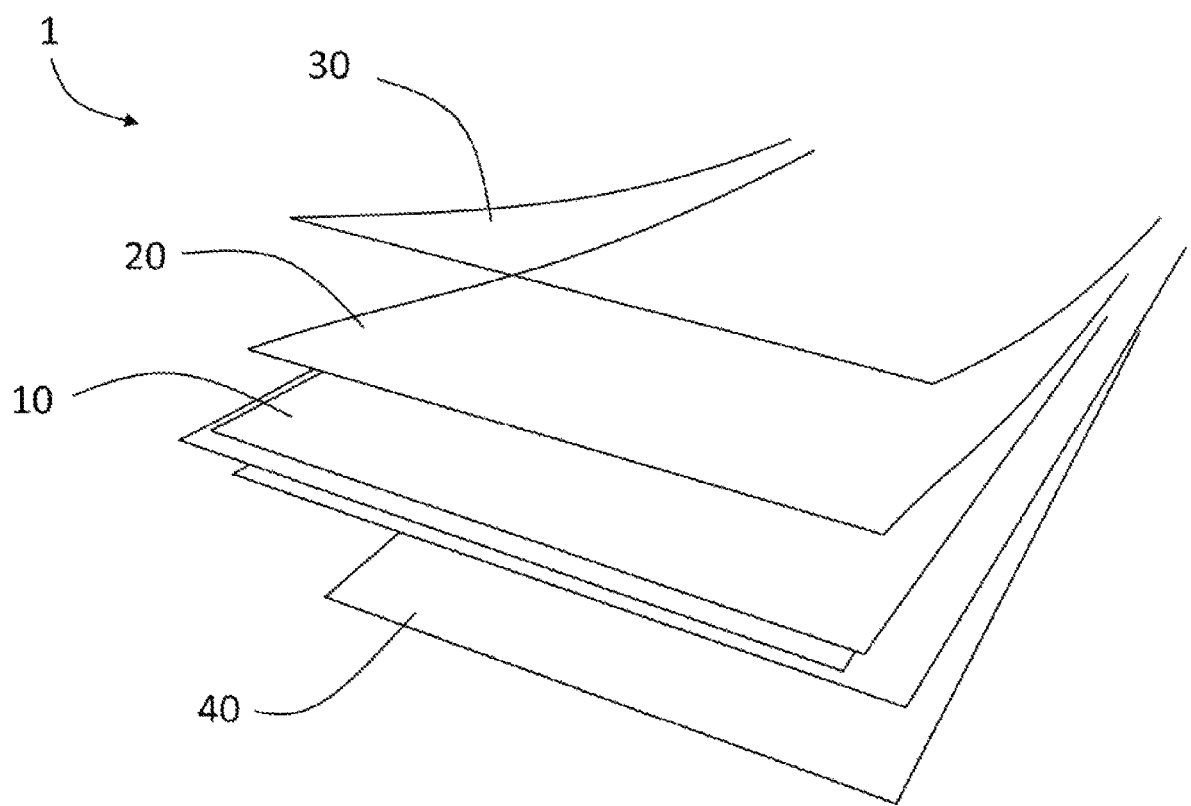

COMPOSITIONS AND METHOD FOR FLOOR CLEANING OR RESTORATION

CROSS-REFERENCE TO RELATED APPLICATION

This application is a divisional of U.S. application Ser. No. 15/969,015, filed May 2, 2018, which claims the benefit of U.S. Application Ser. No. 62/504,869, filed May 11, 2017, both of which are hereby incorporated by reference in their entirety.

FIELD

The present disclosure relates to compositions and methods of using the compositions for treating a floor surface. The disclosed compositions clean the floor surface, repair damage, or maintain the original look of the floor. The disclosed compositions also do not provide a permanent finish on the floor, are temporary, do not significantly increase the gloss of the floor after application, or do not significantly change the finish appearance of the floor after application.

BACKGROUND

All flooring is subject to wear and tear over time. Flooring materials may be treated by the manufacturer or treated after installation to prevent or delay wear. Improved vinyl flooring materials, sometimes called luxury vinyl flooring, have become increasingly popular in both residential and commercial settings. Previously relegated to residential use, the evolution of better protective coatings, or "wear layers," have allowed penetration into markets such as acute care hospitals, long-term care facilities, hospitality, office buildings, schools, universities, and retail settings.

In traditional vinyl composite tile (VCT) flooring, the vinyl is treated with a finish that wears out relatively quickly with use and needs to be restored. In contrast, in certain high-end luxury vinyl floor materials, an extremely hard and durable wear layer is used that resists wear and is virtually maintenance free or requires very little maintenance. This layer makes luxury vinyl floor materials virtually maintenance free in residential locations. However, when such flooring materials are used in high traffic areas, for example in commercial buildings, such as retail stores, restaurants, hotels, health care facilities, hospitals, long term care facilities, etc., over time even the extremely hard wear layer can become worn and require maintenance. Because of the resistant quality of the wear layer due to highly cross-linked systems and other novel chemistries, typical restoration measures have been found ineffective. The wear layer is resistant to typical stripping materials and methods, and conventional floor finishes often fail to adhere to the floor.

SUMMARY

In some embodiments, the present disclosure relates to floor care compositions with a wax, a resin, a surfactant, and diluent. The particular wax, resin, surfactant, and diluent can be each independently selected from the list of those materials described herein.

In some embodiments, the present disclosure relates to floor care compositions with a wax, a resin, a surfactant, and diluent. In a preferred embodiment, the wax is a polyethylene wax emulsion, the resin is an acrylic copolymer emulsion, the surfactant is an alcohol ethoxylate and the diluent is a glycol ether.

In some embodiments, the present disclosure relates to a method of restoring a floor by applying a composition to the floor. The composition has a wax, a resin, a surfactant, and diluent. In a preferred embodiment, the wax is a polyethylene wax emulsion, the resin is an acrylic copolymer emulsion, the surfactant is an alcohol ethoxylate and the diluent is a glycol ether. In the method, the application of the composition to the floor does not change the gloss on the floor by more than 3 points when measured at 60°.

In some embodiments, the present disclosure relates to a method of restoring a floor by applying a composition to the floor. The composition has a wax, a resin, a surfactant, and diluent. In a preferred embodiment, the wax is a polyethylene wax emulsion, the resin is an acrylic copolymer emulsion, the surfactant is an alcohol ethoxylate and the diluent is a glycol ether. In the method, consecutive application of the composition results in a build-up of layers on the floor that is less than 2 μm thick.

In some embodiments, the present disclosure relates to a method of cleaning a floor by applying a composition to the floor. The composition has from about 0.001 to about 0.1 wt. % of a polyethylene wax emulsion, from about 0.01 to about 0.5 wt. % acrylic copolymer emulsion, from about 0.005 to about 0.5 wt. % of an alcohol ethoxylate, from about 0.001 to about 0.15 wt. % a glycol ether solvent, and water.

BRIEF DESCRIPTION OF DRAWINGS

FIG. 1 is a schematic drawing of a layered floor material.

DETAILED DESCRIPTION

The present disclosure relates to methods and compositions for maintaining a floor surface. In particular, the present disclosure relates to methods and compositions for cleaning or restoring a floor surface. The disclosed compositions can be used on a variety of floors but are especially useful on a specialty floor surface such as luxury vinyl tiles, linoleum, rubber and sheet vinyl.

Conventional floor finishes (sometimes referred to as floor polishes, emulsions, waxes, sealers or sealer-finishes) are typically applied by first stripping any previous layers of floor finish off of the floor surface and then applying one or more layers of floor finish composition to the surface. Stripping may be done by using a stripping composition or by mechanical means, or both. The finish composition may be applied and spread onto the prepared (stripped) floor surface by pouring, mopping, spraying, or by other application means, such as a floor cleaning machine. Floor finish compositions may be cured by, for example, chemical curing or by using UV. The cured finish can further be polished or buffed for a glossy, easy-to-maintain finish.

Certain flooring materials, such as high durability luxury vinyl floors, are resistant to conventional stripping compositions and methods, as well as conventional floor finishes. As shown in FIG. 1, luxury vinyl flooring 1 is typically manufactured as a multi-layer product that includes a core layer 10 (e.g., fiberboard core) and a decorative colored and/or textured layer 20 that may imitate various other materials, such as wood, stone, tile, etc. The decorative layer is usually covered by a transparent wear layer 30 that protects that decorative layer. The flooring may also include an undersurface 40.

High durability vinyl floors may have a wear layer that includes polysiloxane, polyvinyl chloride (PVC), polyurethane-reinforced PVC, polyurethane, UV-coated polyurethane, or aluminum oxide or quartz-enhanced polyurethane. While such materials are resistant to both chemical and physical wear, over time even high-durability floors need to be maintained, especially those exposed to high traffic, commercial, or industrial use.

The disclosed compositions apply a coating to the floor that is temporary or not permanent. As used in this disclosure, the phrases "temporary" or "not permanent" mean that the coating wears off with normal wear and tear or foot traffic. The composition can also be removed using a neutral or alkaline floor cleaner, diluted floor stripper, or light pressure. The intense mechanical action or concentrated chemicals traditionally used in a floor stripping process are not required to remove the coating.

The term "weight percent," "wt-%," "percent by weight," "% by weight," and variations of the same refer to the concentration of a substance as the weight of the substance relative to the total weight of the composition. The terms "percent" and "%" are intended to be synonymous with "weight percent" and "wt-%" unless specifically otherwise indicated.

The term "substantially free" is used here to indicate that no substantial amounts (e.g., no more than incidental amounts, such as about 0.1%, about 0.5%, about 1%, about 2%, about 3%, or about 5%) of the component are included in the product.

The disclosed compositions provide the dual benefits of cleaning and restoring the floor surface by simultaneously lifting and removing soil from the floor and depositing a thin layer of protective film into the surface scratches caused by wear and tear on the floor. By depositing such a thin layer of film, the compositions do not "coat" the floor as a traditional floor finish would. The absence of a coating means that after treatment with the disclosed compositions, there isn't a coating that needs to be maintained as a traditional floor coating would (e.g., removal, reapplication, buffing, or burnishing). The "no maintenance" benefit of the floor remains intact because the compositions do not increase the maintenance efforts or create a need for burnishing or recoating. No coating also means that the original look of the floor remains unchanged. The floor retains its home-like appearance and does not gain a plastic look to the surface. The disclosed compositions do not modify the gloss of the floor, the opacity of the top coating on the floor, or cause the pattern on the floor to be obstructed or appear hazy. The compositions are intended to be temporary or not permanent. In some embodiments, once the composition is applied to a floor, the composition does not increase the gloss of the floor when measured at 60° by more than 5 points after 5 consecutive applications, after 10 consecutive applications, or after 20 consecutive applications, as measured using an industry-standard gloss meter such as the micro-TRI-gloss from Byk. In some embodiments, applying the composition to a floor causes a build-up of layers that is less than 10 μm thick, less than 5 μm thick, or less than 2 μm thick after 5 consecutive applications. For comparison, a typical floor finish creates a coating that is approximately 20-40 μm thick.

Composition

The composition comprises a resin, one or more surfactants, and diluent. In some embodiments, the composition includes a plasticizer. In some embodiments, the composition is free or substantially free of a plasticizer. In some embodiments, the composition is free or substantially free of urethanes. In some embodiments, the composition does not cure on the floor surface and the disclosed method does not include curing the floor care composition.

The composition may further comprise additional functional components, including one or more waxes, organic solvents, diluents, thickeners, wetting agents, pH modifiers or buffers, hydrotropes, solubilizers, defoamers, and plasticizers or coalescents. The composition may also include additional components to improve the appearance of the composition, such as fragrances and dyes.

Examples of suitable waxes include waxes, wax emulsions, and wax dispersions or mixtures of waxes of a vegetable, animal, synthetic, and/or mineral origin. Representative waxes include, for example, carnuba, candelilla, lanolin, stearin, beeswax, oxidized polyethylene wax, polyethylene emulsions, polypropylene, copolymers of ethylene and acrylic esters, hydrogenated coconut oil or soybean oil, and the mineral waxes such as paraffin or ceresin. One preferred wax is a polyethylene wax emulsion.

Examples of suitable resins include natural resins or polymers such as rosin resin, synthetic resin, addition polymers such as acrylic polymers or styrene/acrylic polymers, condensation polymers such as polyester polymers, polyurethane polymers, polyether polymers, polyaldehyde polymers, polycarbonates, polyamides, and combinations thereof. The polymers typically have a molecular weight of about 500-2000. Exemplary organic polymers include copolymers of styrene or vinyl toluene with at least one α-β-monoethylenically unsaturated acid or anhydride such as styrene-maleic anhydride resins, rosin/maleic anhydride adducts which are condensed with polyols, and the like. Exemplary acrylic polymers include, but are not limited to, methyl methacrylate/butyl acrylate/methacrylic acid (MMA/BA/MAA) copolymers, methyl methacrylate/butyl acrylate/acrylic acid (MMA/BA/AA) polymers, and the like. Exemplary styrene-acrylic polymers include, but are not limited to, styrene/methyl methacrylate/butyl acrylate/methacrylic acid (S/MMA/BA/MMA) copolymers, styrene/methyl methacrylate/butyl acrylate/acrylic acid (S/MMA/BA/AA) copolymers, and the like. One preferred acrylic polymer is Mor-Glo 2, a 38% active emulsion from Omnova Solutions, Inc., of Chester S.C.

Examples of suitable organic solvents include short or long chain or cyclic alcohols (e.g., ethanol, isopropanol), amines, amides, ethers (e.g., hydroxyethers), ketones, dialkyl carbonates, essential oils, esters (e.g., cyclic esters, dibasic esters and phthalate esters), oxygenated solvents (e.g., glycol ethers) and mixtures thereof. Exemplary solvents include acetamidophenol, acetanilide, acetophenone, 2-acetyl-1-methylpyrrole, benzyl acetate, benzyl alcohol, benzyl benzoate, benzyloxyethanol, ethylene glycol phenyl ether, propylene glycol phenyl ether, 2-(2-aminoethoxy) ethanol, monoethanolamine, diethanolamine, triethanolamine, water-soluble or water-dispersible polymeric amines such as poly(ethylene imine), amyl acetate, amyl alcohol, butanol, 3-butoxyethyl-2-propanol, butyl acetate, n-butyl propionate, cyclohexanone, diacetone alcohol, diethoxyethanol, diethylene glycol methyl ether, diisobutyl carbinol, diisobutyl ketone, dimethyl heptanol, dipropylene glycol tert-butyl ether, ethanol, ethyl acetate, 2-ethylhexanol, ethyl propionate, ethylene glycol, ethylene glycol methyl ether acetate, glycerin, hexanol, isobutanol, isobutyl acetate, isobutyl heptyl ketone, isophorone, isopropanol, isopropyl acetate, methanol, methyl amyl alcohol, methyl n-amyl ketone, 2-methyl-1-butanol, methyl ethyl ketone, methyl isobutyl ketone, 1-pentanol, n-pentyl propionate, 1-propanol, n-propyl acetate, n-propyl propionate, propylene glycol, propylene glycol ethyl ether, tripropylene glycol methyl ether, tripropylene glycol n-butyl ether, diethylene glycol n-butyl ether acetate, diethylene glycol monobutyl ether, ethylene glycol n-butyl ether acetate, ethylene glycol monobutyl ether, dipropylene glycol monobutyl ether, propylene glycol monobutyl ether, ethyl 3-ethoxypropionate, 2,2,4-trimethyl-1,3-pentanediol monoisobutyrate, diethylene glycol monohexyl ether, ethylene glycol monohexyl ether, diethylene glycol monomethyl ether, diethylene glycol monoethyl ether, ethylene glycol methyl ether acetate, ethylene glycol monomethyl ether, dipropylene glycol monomethyl ether, propylene glycol methyl ether acetate, propylene glycol monomethyl ether, diethylene glycol monopropyl ether, ethylene glycol monopropyl ether, dipropylene glycol monopropyl ether, and propylene glycol monopropyl ether. Representative dialkyl carbonates include dimethyl carbonate, diethyl carbonate, dipropyl carbonate, diisopropyl carbonate and dibutyl carbonate. Representative essential oils include benzaldehyde, pinenes (alphas, betas, etc.), terpineos, terpinenes, carvone, cinnamealdehyde, borneol and its esters, citrals, ionenes, jasmine oil, limonene, dipentene, linalool and its esters. Representative dibasic esters include dimethyl adipate, dimethyl succinate, dimethyl glutarate, dimethyl malonate, diethyl adipate, diethyl succinate, diethyl glutarate, dibutyl succinate, and dibutyl glutarate. Representative phthalate esters include dibutyl phthalate, diethylhexyl phthalate and diethyl phthalate.

Examples of suitable surfactants include water soluble or water dispersible nonionic, semi-polar nonionic, anionic, cationic, amphoteric, or zwitterionic surface-active agents, or any combination thereof. The surfactant may be a combination of surfactants.

Nonionic Surfactants Examples of suitable nonionic surfactants include: block polyoxypropylene-polyoxyethylene polymeric compounds, including commercially available products Pluronic® and Tetronic® manufactured by BASF Corp.; condensation products of alkyl phenol with ethylene oxide, including commercially available products Igepal® manufactured by Rhone-Poulenc and Triton® manufactured by Union Carbide; condensation products of a straight or branched chain alcohol having from 4 to 24 carbon atoms with ethylene oxide, including commercially available products Lutensol® manufactured by BASF, Neodol® manufactured by Shell Chemical Co. and Alfonic® manufactured by Vista Chemical Co.; condensation products of straight or branched chain carboxylic acid with ethylene oxide, including commercially available products Nopalcol® manufactured by Henkel Corporation and Lipopeg® manufactured by Lipo Chemicals, Inc.; and alkanoic acid esters formed by reaction with glycerides, glycerin, and polyhydric alcohols.

Particular examples of non-foaming, low foaming, or defoaming nonionic surfactants include: fatty alcohol polyoxypropylene-polyoxyethylene adducts marketed under the trade names Genapol EP®; block polyoxypropylene-polyoxyethylene polymeric compounds with hydrophobic blocks on the outside (ends) of the molecule, sometimes referred to as "reverse" Pluronics or Tetronics, marketed under the trade names Pluronic® R and Tetronic® R; and nonionic surfactants modified by "capping" or "end blocking" terminal hydroxyl groups by reaction with a small hydrophobic molecule or by converting terminal hydroxyl groups to chloride groups. Other examples of non-foaming nonionic surfactants include alkylphenoxypolyethoxyalkanols presented in U.S. Pat. No. 2,903,486; polyalkylene glycol condensates of U.S. Pat. No. 3,048,548; defoaming nonionic surfactants U.S. Pat. No. 3,382,178, having a general formula $Z[(OR)_nOH]_z$ where Z is alkoxylatable material, R is a radical, n is 10-2,000, and z is determined by the number of reactive oxyalkylatable groups; conjugated polyoxyalkylene compounds described in U.S. Pat. No. 2,677,700; and conjugated polyoxyalkylene compounds described in U.S. Pat. No. 2,674,619.

Alkoxylated (e.g., ethoxylated or propoxylated) $C_6$-$C_{18}$ fatty alcohols are suitable surfactants for use in the present compositions. An example of a suitable alkoxylated alcohol is ethoxylated $C_{10}$ alcohol, commercially available as Lutensol XP® from BASF Corp., in Florham Park, N.J.

Anionic Surfactants

Anionic surfactants are useful as detersive surfactants, but also as gelling agents or as part of a gelling or thickening system, as solubilizers, and for hydrotropic effect and cloud point control. The composition may include one or more anionic surfactants. Suitable anionic surfactants for the present composition include: carboxylic acids and their salts, such as alkanoic acids and alkanoates, ester carboxylic acids (e.g. alkyl succinates), ether carboxylic acids, and the like; phosphoric acid esters and their salts; sulfonic acids and their salts, such as isethionates, alkylaryl sulfonates, alkyl sulfonates, sulfosuccinates; and sulfuric acid esters and their salts, such as alkyl ether sulfates, alkyl sulfates, and the like.

Cationic Surfactants

A commonly used group of cationic surfactants is amines, such as alkylamines and amido amines. The amine group includes, for example, alkylamines and their salts, alkyl imidazolines, ethoxylated amines, and quaternary ammonium compounds and their salts. Other cationic surfactants include sulfur (sulfonium) and phosphorus (phosphonium) based compounds that are analogous to the amine compounds.

Amphoteric and Zwitterionic Surfactants

Amphoteric and zwitterionic surfactants include derivatives of secondary and tertiary amines, derivatives of heterocyclic secondary and tertiary amines, or derivatives of quaternary ammonium, quaternary phosphonium or tertiary sulfonium compounds. The ammonium, phosphonium, or sulfonium compounds can be substituted with aliphatic substituents, e.g., alkyl, alkenyl, or hydroxyalkyl; alkylene or hydroxy alkylene; or carboxylate, sulfonate, sulfate, phosphonate, or phosphate groups. Betaine and sultaine surfactants are exemplary zwitterionic surfactants for use in the composition.

In some embodiments, the composition includes a surfactant that also acts as a plasticizer to promote flexibility and plasticity in the formula. Exemplary surfactants that can also serve as a plasticizer include alcohol ethoxylates, amphoteric carboxylates, sodium sulfonates, aminocarboxylates, amine oxides, alkoxylate polymers, EO/PO copolymers, and octylaminoproprionate. The selection of the surfactant is not limited to surfactants that also have plasticizer properties and additional or different surfactants can be selected.

The composition also includes a diluent, which is typically water and may also contain one or more suitable organic solvents.

The composition may optionally include one or more thickeners. Exemplary thickeners include gums and other polysaccharides such as carrageenan, *cassia* gum, diutan gum, gellan gum, guar gum, gum arabic, gum tragacanth, locust bean gum, whelan gum and xanthan gum; alginates such as agar; cellulose ethers such as ethyl cellulose, hydroxyethyl cellulose, ethyl hydroxyethyl cellulose, methyl cellulose, hydroxypropyl cellulose, hydroxypropyl methyl cellulose, and other alkyl or hydroxyalkyl cellulose ethers; acrylic acid copolymers; polyethylene oxides (e.g., high molecular weight polyethylene oxides) such as polyethylene glycols and methoxypolyethylene glycols; polyvinyl alcohols; polyvinyl pyrrolidone; starches; polyurethanes; methyl vinyl ether/maleic anhydride copolymers; and mixtures thereof. The water thickeners also may include hydrophobe-modified ethoxy urethane (HEUR) thickeners, hydrophobe-modified alkali soluble emulsion (HASE) thickeners, hydrophobe-modified hydroxyethyl cellulose (HM-HEC) thickeners, and HEUR-ASE combination thickeners. The amount of thickener, expressed as solids, may be about 0.1 to about 30%, about 2 to about 20% or about 3 to about 10% of the total concentrate weight.

The composition may optionally include one or more wetting agents to assist with the spreading of the composition onto the floor. Exemplary wetting agents include anionic fluorosurfactants, silicone-modified polyacrylate, polyether-modified siloxane, polyether-modified polysiloxane, polyether-modified polydimethylsiloxane, fatty alcohol alkoxylate, and polyethylene glycol polypropylene glycol block copolymer. The amount of wetting agent as solids, may be about 0.05 to about 0.20%, about 0.05 to about 0.50% or about 0.01 to about 1.0% of the total concentrate weight.

The pH of the composition is preferably in the range of about 5 to about 10 or about 6 to about 8. The pH can be adjusted using various bases, acids or buffering agents. Exemplary acids include organic acids such as citric acid, acetic acid, lactic acid and inorganic acids. Exemplary bases include sodium hydroxide and potassium hydroxide. Exemplary buffers include phosphates, carbonates, amines, bicarbonates, and citrates. Exemplary phosphates include anhydrous mono-, di-, or trisodium phosphate, sodium tripolyphosphate, tetrasodium pyrophosphate and tetrapotassium pyrophosphate. Exemplary carbonates include sodium carbonate, potassium carbonate, and sesquicarbonate. Exemplary citrates include sodium or potassium citrate. Exemplary amines include urea, diethanolamine, triethanolamine, and morpholine.

The composition may optionally include one or more hydrotropes or solubilizers. Hydrotropes can be included in compositions to aid in compositional stability and to help solubilize other components in aqueous formulations by coupling with the other components. Representative classes of hydrotropic coupling agents or solubilizers which can be employed include anionic surfactants such as alkyl sulfates and alkane sulfonates, linear alkyl benzene or naphthalene sulfonates, secondary alkane sulfonates, alkyl ether sulfates or sulfonates, alkyl phosphates or phosphonates, dialkyl sulfosuccinic acid esters, sugar esters (e.g., sorbitan esters), amine oxides (mono-, di-, or tri-alkyl) and $C_5$-$C_{10}$ alkyl glucosides. Preferred hydrotropes include n-octanesulfonate, available as NAS 8D from Ecolab, Inc., in St Paul, Minn.; n-octyl dimethylamine oxide; commonly available aromatic sulfonates such as alkyl benzene sulfonates (e.g. xylene sulfonates) or naphthalene sulfonates; and aryl or alkaryl phosphate esters or their alkoxylated analogues having 1 to about 40 ethylene, propylene or butylene oxide units. Other preferred hydrotropes include nonionic surfactants of $C_6$-$C_{24}$ alcohol alkoxylates (ethoxylates, propoxylates, or butoxylates); $C_6$-$C_{24}$ alkylphenol alkoxylates; $C_6$-$C_{24}$ alkylpolyglycosides; $C_6$-$C_{24}$ fatty acid ester ethoxylates, propoxylates or glycerides; and $C_4$-$C_{12}$ mono or dialkanolamides. The composition may contain about 0 to about 15 wt-%, about 0.005 to about 7 wt-%, about 0.1 to about 12 wt-%, about 0.5 to about 10 wt-%, about 1.0 to about 8 wt-%, or about 2.0 to about 5.0 wt-% of a hydrotrope or solubilizer.

The composition may optionally contain a plasticizer or coalescent. A plasticizing agent is typically a compound or a mixture that can associate with the polymer and thereby modify the physical properties of the polymer or of the composition itself. For example, a plasticizing agent may serve to change the hardness, flexibility, glass transition temperature (Tg) to form a continuous film. Exemplary plasticizers include butyl benzyl phthalate, dibutyl phthalate, dimethyl phthalate, triphenyl phosphate, 2-ethylhexyl benzyl phthalate, butyl cyclohexyl phthalate, mixed benzoic acid and fatty oil acid esters of pentaerythritol, poly(propylene adipate) dibenzoate, diethylene glycol dibenzoate, tetrabutylthiodi-succinate, butyl phthalyl butyl glycolate, triethyl citrate, acetyl triethyl citrate, tributyl citrate, acetyl tributyl citrate, dibenzyl sebacate, tricresyl phosphate, tributoxyethyl phosphate, toluene ethyl sulfonamide, the di-2-ethylhexyl ester of hexamethylene glycol diphthalate, di-(methylcyclohexyl)-phthalate, and tributyl phosphate. Exemplary coalescents include monobutyl, monoethyl, monomethyl or other monoalkyl ethers of diethylene glycol or diproplyleneglycol, isophorone, benzyl alcohol, butyl cellosolve, and 3-methoxybutanol-1. In some embodiments, the plasticizer or coalescent is present from about 0 to about 10 wt-%, from about 0 to about 5 wt-%, or from about 0 to about 2 wt-%. In some embodiments, the amount of plasticizer is limited to less than 1.0 wt-%, or less than 0.5 wt. %. In some embodiments, the composition is free or substantially free of a plasticizer or coalescent. And in some embodiments, the composition includes a surfactant that has both surfactant properties and plasticizer properties.

The composition may optionally contain a defoamer. Exemplary defoamers are polydimethosiloxanes. In some embodiments, the defoamer is present from about 0 to about 2 wt-%, from about 0 to about 1 wt-%, or from about 0 to about 0.5 wt-%. In some embodiments, the amount of defoamer is limited to less than 0.3 wt-%, or less than 0.2 wt. %.

The composition may further comprise one or more fragrances or dyes.

The composition can be provided as a concentrate or as a ready-to-use solution. The concentrate can be used as is or can be further diluted to provide a use solution. If the composition is provided as a concentrate, the composition may be in the form of a solid (e.g., a powder, block, tablet, pellet, granule, etc.), or in the form of a liquid (e.g., a free-flowing liquid, a thickened liquid, an emulsion, a gel, or a paste). The ready-to-use solution can be formulated as a water-thin liquid, thickened liquid, emulsion, gel or paste.

According to embodiments, the composition may comprise one or more diluents. In a preferred embodiment, the diluent is water. A liquid concentrate of the composition may comprise about 10 to about 95 wt-%, or about 25 to about 75 wt-%, or about 30 to about 70 wt-% of diluent (e.g., water or other aqueous liquid). The concentrate (liquid or solid) may be diluted by a user with water or another suitable diluent to prepare a use solution. For example, the concentrate composition can be diluted prior to use with water at a ratio of about 1 part concentrate to about 10-1,000 parts water. It will be understood by those skilled in the art that the dilution will depend on the concentration of the concentrate and the desired use solution.

In some embodiments, the use solution (composition either formulated as a use solution, or use solution prepared from a concentrate) comprises about 80 to about 99 wt-%, or about 90 to about 99 wt-%, or about 95 to about 99 wt-% water. In an exemplary embodiment, the use solution comprises about 97 to about 99 wt-% water.

Exemplary formulations of the composition are shown in TABLE 1 below.

TABLE 1

Exemplary Formulations

| Formulation | Water | Wax | Resin | Surfactant | Solvent | Additional Components |
|---|---|---|---|---|---|---|
| General | 97.0-99.9% | 0-0.5% | 0-1% | 0-1% | 0-0.5% | 0-1% |
| Use Solution | 98.6%-99.9% | 0-0.2% | 0-0.5% | 0-0.5% | 0-0.2% | 0-0.5% |
| (wt-%) | 99.4-99.9% | 0-0.1% | 0-0.2% | 0-0.2% | 0-0.1% | 0-0.2% |
| Concentrate | 0%-97.9% | 0.3%-10% | 1%-50% | 0.02%-40% | 0.3%-10% | 1%-50% |
| Concentrate | 69%-97.9% | 0.3%-3.0% | 1%-10% | 0.02%-10% | 0.3%-8% | 1%-10% |
| A | 81.5%-96.2% | 0.4%-1.5% | 2%-8% | 1%-5% | 0.4%-4% | 2%-8% |
| (wt-%) | 88.5-94% | 0.5%-1.0% | 3%-6% | 2%-3% | 0.5%-1.5% | 3%-6% |
| Concentrate | 30%-87% | 0.5%-10% | 10%-30% | 2%-20% | 0.5%-10% | 10%-30% |
| B | 54%-78% | 1%-5% | 15%-20% | 5%-15% | 1%-6% | 15%-20% |
| (wt-%) | 63%-72% | 2%-3% | 16%-18% | 8%-12% | 2%-4% | 16%-18% |
| Concentrate | 0%-67% | 2%-10% | 20%-50% | 10%-30% | 1%-15% | 20%-50% |
| C | 13%-54% | 3%-7% | 25%-45% | 15%-25% | 3%-10% | 25%-45% |
| (wt-%) | 28%-43% | 4%-5% | 30%-38% | 18%-22% | 5%-7% | 30%-38% |

Gloss on the floor can tested using an industry-standard gloss meter such as the micro-TRI-gloss from Byk.

The thickness of the coating on the floor can be determined using a Scanning Electron Microscope (SEM).

Method of Application

The disclosed compositions can be used in a method to clean, repair damage, or restore the original look to the flooring surface. In some embodiments, the floor is optionally first cleaned, swept, or vacuumed to remove any loose debris. The compositions can be applied using a variety of methods and tools, including spraying (e.g., with a trigger sprayer, pump sprayer, aerosol, or with an onboard spray device located on a mop), squirting, brushing, flat or string mopping, roll coating, applying with a paint roller, applying with a T-bar applicator, using a machine such as a floor cleaning machine, and flood coating. Mop application, especially flat mopping, is preferred for coating most floors. Suitable mops include those described in U.S. Pat. Nos. 5,315,734, 5,390,390, 5,680,667 and 5,887,311, the complete disclosures of which are hereby incorporated by reference in their entirety. The composition can be scrubbed onto the floor using a pad, such as a scouring pad, abrasive pad, a rag, or any other suitable method. The spreading and scrubbing can be performed as separate steps, or simultaneously as a single step.

Exemplary mop heads include string mops such as those available from Amsan; and flat mops such as those available from Rubbermaid, Unger or Ecolab. The mop head material can be made of for example, cotton, rayon, polyester, nylon or a combination thereof. The mop head is preferably a flat mop made of polyester and nylon microfiber. A typical application rate is 2000 square feet per gallon, but other rates may be used depending upon the floor surface and desired performance. In some embodiments, the composition is applied to the floor multiple times a day, 3 times a day, 2 times a day, once a day, every other day, once a week, several times a week, every other week, or once a month.

The compositions can be applied to a variety of floor substrates. The compositions are especially useful for luxury vinyl, laminate, rubber, linoleum, and sheet vinyl floors but can be used on any floor to maintain the appearance of the floor, extend the time in between stripping and refinishing the floor, or reduce the appearance of wear and tear. Representative flooring substrates include, for example, resilient substrates such as sheet goods (e.g., vinyl flooring, linoleum or rubber sheeting), vinyl composite tiles, luxury vinyl tiles, vinyl asbestos tiles, rubber tiles, cork and synthetic sports floors, and non-resilient substrates such as concrete, stone, marble, wood, bamboo, ceramic tile, grout, Terrazzo and other poured or "dry shake" floors, epoxy, polyvinyl chloride (PVC), and methyl methacrylates (MMA). The compositions are especially useful for use on luxury vinyl tiles and other flooring types where it is desirable to reduce the visibility of damage from wear and tear without modifying the original appearance or finish of the floor (e.g., by either changing a matte floor finish to a glossy finish or a glossy floor finish to a matte finish).

EXAMPLES

Example 1

Example 1 evaluated the change in the gloss on luxury vinyl tile material after successive applications of composition. The formulas tested are shown in Table 2:

TABLE 2

| Material | Formula A (in wt. %) | Formula B (in wt. %) |
|---|---|---|
| Water, DI | 91.54% | 89.04% |
| diethylene glycol monoethyl ether | 0.66% | 0.66% |
| dihexylene glycol monoethyl ether | 0.09% | 0.09% |
| branched $C_{10}$ 5EO alcohol ethoxylate | 2.50% | 1.00% |
| fatty alcohol polyoxypropylene-polyoxyethylene | | 4.00% |
| polydimethyl siloxane (10% sol) | 0.20% | 0.20% |
| anionic fluorosurfactant (10%) | 0.15% | 0.15% |
| styrene acrylic polymer | 4.26% | 4.26% |
| oxidized polyethylene wax | 0.60% | 0.60% |

Formulas A and B were applied to four different colors of luxury vinyl tile samples by applying a line of the liquid product onto the tile using a disposable pipette and spreading with a microfiber floor finish applicator pad. The tile samples were Tardus Centiva American Cherry (brown in color), Johnsonite Falcon (dark brown in color), Natural Creations Ronoak Charcoal (black in color), and Natural Creations Fruitwood Alabaster (white in color). The composition was allowed to dry and then the gloss of the tile was measured with an industry-standard gloss meter such as the micro-TRI-gloss from Byk. Gloss measurements were taken at 20 degrees and 60 degrees. Additional layers of composition were applied to the tile on top of the previous layers, again by spreading the composition onto the tile with a microfiber finish applicator pad. The new composition was allowed to dry and then additional gloss measurements were taken. This process was repeated for a total of 20 applications. The results are recorded in Tables 3 and 4.

TABLE 3

| | Formula A Gloss at 20° | | | | Formula B Gloss at 20° | | | |
|---|---|---|---|---|---|---|---|---|
| Application | Tardus Centiva | Johnsonite Falcon | Natural Creations Ronoak | Natural Creations Fruitwood | Tardus Centiva | Johnsonite Falcon | Natural Creations Ronoak | Natural Creations Fruitwood |
| Initial | 1.7 | 0.7 | 1.4 | 1.5 | 1.8 | 0.7 | 1.4 | 1.7 |
| 1 | 1.8 | 0.8 | 1.4 | 1.5 | 1.9 | 0.7 | 1.3 | 1.7 |
| 2 | 1.8 | 0.8 | 1.5 | 1.5 | 2.0 | 0.7 | 1.3 | 1.6 |
| 3 | 1.8 | 0.8 | 1.4 | 1.6 | 2.0 | 0.7 | 1.3 | 1.7 |
| 4 | 1.9 | 0.8 | 1.4 | 1.6 | 2.0 | 0.8 | 1.3 | 1.7 |
| 5 | 1.9 | 0.8 | 1.5 | 1.6 | 1.9 | 0.8 | 1.3 | 1.7 |
| 6 | 2.0 | 0.8 | 1.5 | 1.6 | 2.0 | 0.8 | 1.3 | 1.6 |
| 7 | 2.0 | 0.8 | 1.5 | 1.6 | 1.9 | 0.8 | 1.2 | 1.7 |
| 8 | 2.0 | 0.8 | 1.4 | 1.6 | 1.9 | 0.8 | 1.2 | 1.6 |
| 9 | 2.0 | 0.8 | 1.4 | 1.6 | 1.9 | 0.8 | 1.3 | 1.6 |
| 10 | 2.0 | 0.8 | 1.4 | 1.6 | 1.8 | 0.8 | 1.3 | 1.7 |
| 11 | 2.0 | 0.8 | 1.4 | 1.6 | 1.8 | 0.8 | 1.2 | 1.7 |
| 12 | 2.0 | 0.8 | 1.4 | 1.6 | 1.8 | 0.8 | 1.2 | 1.7 |
| 13 | 2.1 | 0.9 | 1.4 | 1.6 | 1.8 | 0.8 | 1.2 | 1.7 |
| 14 | 2.0 | 0.9 | 1.4 | 1.6 | 1.8 | 0.8 | 1.2 | 1.6 |
| 15 | 2.0 | 0.9 | 1.4 | 1.7 | 1.8 | 0.7 | 1.2 | 1.6 |
| 16 | 2.1 | 0.9 | 1.4 | 1.7 | 1.9 | 0.8 | 1.3 | 1.7 |
| 17 | 2.1 | 0.9 | 1.4 | 1.7 | 1.8 | 0.8 | 1.3 | 1.7 |
| 18 | 2.2 | 0.9 | 1.3 | 1.6 | 1.8 | 0.8 | 1.2 | 1.7 |
| 19 | 2.0 | 0.8 | 1.3 | 1.6 | 1.7 | 0.8 | 1.2 | 1.7 |
| 20 | 2.1 | 0.9 | 1.2 | 1.6 | 1.7 | 0.7 | 1.2 | 1.7 |
| Δ between initial and final application | 0.4 | 0.2 | −0.2 | 0.1 | −0.1 | 0 | −0.2 | 0 |

TABLE 4

| | Formula A Gloss at 60° | | | | Formula B Gloss at 60° | | | |
|---|---|---|---|---|---|---|---|---|
| Application | Tardus Centiva | Johnsonite Falcon | Natural Creations Ronoak | Natural Creations Fruitwood | Tardus Centiva | Johnsonite Falcon | Natural Creations Ronoak | Natural Creations Fruitwood |
| Initial | 1.7 | 0.7 | 1.4 | 1.5 | 1.8 | 0.7 | 1.4 | 1.7 |
| 1 | 1.8 | 0.8 | 1.4 | 1.5 | 1.9 | 0.7 | 1.3 | 1.7 |
| 2 | 1.8 | 0.8 | 1.5 | 1.5 | 2.0 | 0.7 | 1.3 | 1.6 |
| 3 | 1.8 | 0.8 | 1.4 | 1.6 | 2.0 | 0.7 | 1.3 | 1.7 |
| 4 | 1.9 | 0.8 | 1.4 | 1.6 | 2.0 | 0.8 | 1.3 | 1.7 |
| 5 | 1.9 | 0.8 | 1.5 | 1.6 | 1.9 | 0.8 | 1.3 | 1.7 |
| 6 | 2.0 | 0.8 | 1.5 | 1.6 | 2.0 | 0.8 | 1.3 | 1.6 |
| 7 | 2.0 | 0.8 | 1.5 | 1.6 | 1.9 | 0.8 | 1.2 | 1.7 |
| 8 | 2.0 | 0.8 | 1.4 | 1.6 | 1.9 | 0.8 | 1.2 | 1.6 |
| 9 | 2.0 | 0.8 | 1.4 | 1.6 | 1.9 | 0.8 | 1.3 | 1.6 |
| 10 | 2.0 | 0.8 | 1.4 | 1.6 | 1.8 | 0.8 | 1.3 | 1.7 |
| 11 | 2.0 | 0.8 | 1.4 | 1.6 | 1.8 | 0.8 | 1.2 | 1.7 |
| 12 | 2.0 | 0.8 | 1.4 | 1.6 | 1.8 | 0.8 | 1.2 | 1.7 |
| 13 | 2.1 | 0.9 | 1.4 | 1.6 | 1.8 | 0.8 | 1.2 | 1.7 |
| 14 | 2.0 | 0.9 | 1.4 | 1.6 | 1.8 | 0.8 | 1.2 | 1.6 |
| 15 | 2.0 | 0.9 | 1.4 | 1.7 | 1.8 | 0.7 | 1.2 | 1.6 |
| 16 | 2.1 | 0.9 | 1.4 | 1.7 | 1.9 | 0.8 | 1.3 | 1.7 |
| 17 | 2.1 | 0.9 | 1.4 | 1.7 | 1.8 | 0.8 | 1.3 | 1.7 |
| 18 | 2.2 | 0.9 | 1.3 | 1.6 | 1.8 | 0.8 | 1.2 | 1.7 |
| 19 | 2.0 | 0.8 | 1.3 | 1.6 | 1.7 | 0.8 | 1.2 | 1.7 |
| 20 | 2.1 | 0.9 | 1.2 | 1.6 | 1.7 | 0.7 | 1.2 | 1.7 |
| Δ between initial and final application | 0.4 | 0.2 | −0.2 | 0.1 | −0.1 | 0 | −0.2 | 0 |

The rule of thumb is that a trained operator can visually detect a change in the gloss of 3 points or more while the average person can visually detect a change in the gloss of 5 points or more. Tables 3 and 4 show that any change in the gloss of the tile over 20 successive applications was insignificant and visually imperceptible to either a trained or an untrained observer.

Example 2

Example 2 evaluated the change in the gloss on linoleum tile material after successive applications of the two formulas listed in Table 5, and tested against a commercially available competitor's product.

TABLE 5

| Material | Formula A (in wt. %) | Formula B (in wt. %) |
| --- | --- | --- |
| Water, DI | 99.208% | 99.869% |
| diethylene glycol monoethyl ether | 0.062% | 0.010% |
| dihexylene glycol monoethyl ether | 0.008% | 0.001% |
| branched $C_{10}$ 5EO alcohol ethoxylate | 0.234% | 0.039% |
| polydimethyl siloxane (10% sol) | 0.019% | 0.003% |
| anionic fluorosurfactant (10%) | 0.014% | 0.002% |
| styrene acrylic polymer | 0.399% | 0.067% |
| oxidized polyethylene wax | 0.056% | 0.009% |

Six different samples of Forbo linoleum flooring were first scratched using a weighted green scouring pad and either 20 or 40 passes on a Gardner Straight Line Abrasion instrument, which included Modular T3233, MCT-621, Concrete 3707, Real 3136, Piano 3629, and Striato 5216 flooring. The competitor's product was diluted at 2 oz/gal and 13 oz/gal as per the manufacturer's label instructions. The scratched linoleum was then treated by applying a line of the liquid use-solution product onto the tile using a disposable pipette and spreading with a microfiber floor finish applicator pad. The composition was allowed to dry and then the gloss of the tile was measured with an industry-standard gloss meter such as the micro-TRI-gloss from Byk. Gloss measurements were taken at 20 degrees and 60 degrees. Additional layers of composition were applied to the tile on top of the previous layers, again by spreading the composition onto the tile with a microfiber finish applicator pad. The new composition was allowed to dry and then additional gloss measurements were taken. This process was repeated for a total of 5 applications of the more concentrated solutions or 20 applications of the more dilute solutions. The results are recorded in Tables 6 through 9.

TABLE 6

| | Formula A Gloss at 20° | | | | | | Formula B Gloss at 20° | | | | | |
| --- | --- | --- | --- | --- | --- | --- | --- | --- | --- | --- | --- | --- |
| Application | Modular T3233 | MCT-621 | Concrete 3707 | Real 3136 | Piano 3629 | Striato 5216 | Modular T3233 | MCT-621 | Concrete 3707 | Real 3136 | Piano 3629 | Striato 5216 |
| Initial | 0.9 | 1.0 | 0.6 | 1.2 | 1.2 | 1.1 | 0.8 | 1.0 | 0.5 | 1.2 | 1.2 | 1.1 |
| 1 | 0.9 | 1.0 | 0.6 | 1.2 | 1.3 | 1.2 | 0.9 | 1.0 | 0.6 | 1.2 | 1.2 | 1.1 |
| 2 | 0.9 | 1.0 | 0.6 | 1.2 | 1.3 | 1.2 | 0.9 | 1.0 | 0.6 | 1.2 | 1.2 | 1.1 |
| 3 | 0.9 | 1.0 | 0.6 | 1.1 | 1.3 | 1.1 | 0.9 | 1.0 | 0.5 | 1.1 | 1.3 | 1.1 |
| 4 | 1.0 | 1.0 | 0.6 | 1.2 | 1.3 | 1.1 | 0.8 | 1.0 | 0.5 | 1.2 | 1.3 | 1.1 |
| 5 | 0.9 | 1.0 | 0.6 | 1.2 | 1.3 | 1.1 | 0.9 | 1.0 | 0.5 | 1.2 | 1.3 | 1.1 |
| 6 | | | | | | | 0.9 | 1.0 | 0.6 | 1.3 | 1.4 | 1.2 |
| 7 | | | | | | | 0.9 | 1.0 | 0.6 | 1.2 | 1.3 | 1.1 |
| 8 | | | | | | | 0.9 | 1.0 | 0.6 | 1.2 | 1.3 | 1.2 |
| 9 | | | | | | | 0.8 | 1.0 | 0.6 | 1.2 | 1.3 | 1.1 |
| 10 | | | | | | | 0.8 | 0.9 | 0.6 | 1.2 | 1.3 | 1.2 |
| 11 | | | | | | | 0.8 | 0.9 | 0.6 | 1.1 | 1.3 | 1.1 |
| 12 | | | | | | | 0.9 | 1.0 | 0.6 | 1.2 | 1.3 | 1.1 |
| 13 | | | | | | | 0.8 | 1.0 | 0.6 | 1.2 | 1.3 | 1.2 |
| 14 | | | | | | | 0.9 | 1.0 | 0.6 | 1.2 | 1.4 | 1.2 |
| 15 | | | | | | | 0.9 | 0.9 | 1.6 | 1.2 | 1.3 | 1.1 |
| 16 | | | | | | | 0.9 | 1.1 | 0.7 | 1.3 | 1.4 | 1.3 |
| 17 | | | | | | | 0.9 | 1.0 | 0.6 | 1.2 | 1.3 | 1.1 |
| 18 | | | | | | | 0.9 | 1.0 | 0.5 | 1.2 | 1.3 | 1.1 |
| 19 | | | | | | | 0.9 | 1.0 | 0.7 | 1.1 | 1.3 | 1.1 |
| 20 | | | | | | | 0.9 | 1.0 | 0.6 | 1.2 | 1.3 | 1.1 |
| Δ between initial and final application | 0.0 | 0.0 | 0.0 | 0.0 | 0.0 | 0.1 | 0.0 | 0.0 | 0.1 | 0.0 | 0.1 | 0.0 |

TABLE 7

| | Formula A Gloss at 60° | | | | | | Formula B Gloss at 60° | | | | | |
|---|---|---|---|---|---|---|---|---|---|---|---|---|
| Application | Modular T3233 | MCT-621 | Concrete 3707 | Real 3136 | Piano 3629 | Striato 5216 | Modular T3233 | MCT-621 | Concrete 3707 | Real 3136 | Piano 3629 | Striato 5216 |
| Initial | 7.0 | 5.8 | 5.7 | 7.9 | 8.1 | 6.8 | 6.4 | 5.9 | 5.6 | 7.8 | 7.5 | 7.1 |
| 1 | 7.1 | 6.0 | 5.8 | 8.1 | 8.2 | 6.9 | 6.8 | 6.0 | 5.6 | 8.0 | 8.1 | 7.1 |
| 2 | 7.1 | 6.0 | 5.9 | 8.3 | 8.5 | 7.2 | 6.6 | 6.1 | 5.7 | 8.0 | 7.9 | 6.9 |
| 3 | 7.5 | 6.2 | 6.0 | 8.3 | 8.4 | 7.2 | 6.7 | 6.0 | 5.6 | 8.0 | 8.2 | 7.0 |
| 4 | 7.3 | 6.2 | 6.0 | 8.2 | 8.6 | 7.2 | 6.4 | 5.9 | 5.6 | 7.9 | 8.1 | 7.3 |
| 5 | 7.6 | 6.3 | 6.1 | 8.2 | 8.6 | 7.2 | 6.7 | 6.0 | 5.6 | 7.9 | 8.2 | 7.1 |
| 6 | | | | | | | 6.8 | 6.1 | 5.7 | 8.2 | 8.3 | 7.3 |
| 7 | | | | | | | 6.5 | 5.9 | 5.7 | 8.0 | 8.2 | 7.2 |
| 8 | | | | | | | 6.9 | 6.1 | 5.7 | 8.3 | 8.3 | 7.2 |
| 9 | | | | | | | 6.4 | 6.0 | 5.6 | 8.0 | 8.2 | 7.2 |
| 10 | | | | | | | 6.6 | 5.9 | 5.6 | 8.2 | 8.3 | 7.3 |
| 11 | | | | | | | 6.6 | 6.0 | 5.7 | 8.2 | 8.4 | 7.3 |
| 12 | | | | | | | 6.8 | 6.2 | 5.8 | 8.2 | 8.5 | 7.4 |
| 13 | | | | | | | 6.8 | 6.3 | 5.8 | 8.1 | 8.5 | 7.4 |
| 14 | | | | | | | 6.9 | 6.2 | 5.9 | 8.2 | 8.6 | 7.6 |
| 15 | | | | | | | 6.9 | 6.4 | 5.9 | 8.2 | 8.7 | 7.5 |
| 16 | | | | | | | 6.6 | 6.3 | 5.9 | 8.2 | 8.5 | 7.4 |
| 17 | | | | | | | 6.7 | 6.2 | 5.9 | 8.1 | 8.6 | 7.4 |
| 18 | | | | | | | 6.7 | 6.2 | 5.8 | 8.2 | 8.5 | 7.5 |
| 19 | | | | | | | 6.7 | 6.3 | 6.0 | 8.0 | 8.5 | 7.6 |
| 20 | | | | | | | 6.7 | 6.2 | 5.8 | 8.0 | 8.4 | 7.5 |
| Δ between initial and final application | 0.6 | 0.5 | 0.4 | 0.3 | 0.5 | 0.4 | 0.3 | 0.3 | 0.2 | 0.2 | 0.9 | 0.4 |

TABLE 8

| | Competitor Product 13 oz/gal Gloss at 20° | | | | | | Competitor Product 2 oz/gal Gloss at 20° | | | | | |
|---|---|---|---|---|---|---|---|---|---|---|---|---|
| Application | Modular T3233 | MCT-621 | Concrete 3707 | Real 3136 | Piano 3629 | Striato 5216 | Modular T3233 | MCT-621 | Concrete 3707 | Real 3136 | Piano 3629 | Striato 5216 |
| Initial | 0.9 | 0.9 | 0.5 | 1.2 | 1.2 | 1.1 | 0.9 | 0.9 | 0.5 | 1.2 | 1.2 | 1.1 |
| 1 | 1.0 | 1.1 | 0.7 | 1.3 | 1.4 | 1.2 | 0.9 | 1.1 | 0.6 | 1.2 | 1.2 | 1.1 |
| 2 | 1.2 | 1.2 | 0.9 | 1.6 | 1.7 | 1.4 | 0.9 | 1.0 | 0.6 | 1.3 | 1.3 | 1.1 |
| 3 | 1.2 | 1.2 | 0.9 | 1.7 | 1.9 | 1.5 | 0.9 | 1.1 | 0.6 | 1.3 | 1.4 | 1.1 |
| 4 | 1.3 | 1.3 | 0.9 | 1.7 | 1.9 | 1.5 | 0.9 | 1.1 | 0.7 | 1.4 | 1.4 | 1.1 |
| 5 | 1.3 | 1.4 | 1.1 | 1.9 | 2.1 | 1.8 | 1.0 | 1.1 | 0.7 | 1.4 | 1.4 | 1.2 |
| 6 | | | | | | | 1.1 | 1.3 | 0.9 | 1.6 | 1.6 | 1.2 |
| 7 | | | | | | | 1.0 | 1.1 | 0.7 | 1.5 | 1.6 | 1.2 |
| 8 | | | | | | | 1.1 | 1.1 | 0.8 | 1.6 | 1.6 | 1.3 |
| 9 | | | | | | | 1.1 | 1.1 | 0.7 | 1.5 | 1.6 | 1.3 |
| 10 | | | | | | | 1.1 | 1.2 | 0.7 | 1.6 | 1.6 | 1.3 |
| 11 | | | | | | | 1.1 | 1.1 | 0.8 | 1.5 | 1.6 | 1.3 |
| 12 | | | | | | | 1.1 | 1.1 | 0.8 | 1.6 | 1.8 | 1.4 |
| 13 | | | | | | | 1.1 | 1.1 | 0.9 | 1.6 | 1.8 | 1.4 |
| 14 | | | | | | | 1.2 | 1.2 | 0.9 | 1.6 | 1.8 | 1.4 |
| 15 | | | | | | | 1.1 | 1.2 | 0.9 | 1.7 | 1.8 | 1.4 |
| 16 | | | | | | | 1.2 | 1.3 | 1.0 | 1.8 | 1.9 | 1.5 |
| 17 | | | | | | | 1.1 | 1.2 | 0.9 | 1.7 | 1.9 | 1.5 |
| 18 | | | | | | | 1.2 | 1.2 | 1.0 | 1.7 | 1.9 | 1.4 |
| 19 | | | | | | | 1.2 | 1.3 | 1.0 | 1.9 | 1.9 | 1.5 |
| 20 | | | | | | | 1.2 | 1.2 | 1.0 | 1.8 | 1.9 | 1.5 |
| Δ between initial and final application | 0.4 | 0.5 | 0.6 | 0.7 | 0.9 | 0.7 | 0.3 | 0.3 | 0.5 | 0.6 | 0.7 | 0.4 |

TABLE 9

| Application | Competitor Product 1 3 oz/gal Gloss at 60° | | | | | | Competitor Product 2 oz/gal Gloss at 60° | | | | | |
|---|---|---|---|---|---|---|---|---|---|---|---|---|
| | Modular T3233 | MCT-621 | Concrete 3707 | Real 3136 | Piano 3629 | Striato 5216 | Modular T3233 | MCT-621 | Concrete 3707 | Real 3136 | Piano 3629 | Striato 5216 |
| Initial | 6.8 | 5.7 | 5.5 | 7.8 | 8.0 | 7.0 | 6.8 | 5.9 | 5.4 | 7.8 | 7.8 | 6.8 |
| 1 | 8.4 | 7.0 | 6.6 | 9.3 | 9.7 | 8.2 | 7.3 | 6.5 | 5.7 | 8.3 | 8.5 | 7.0 |
| 2 | 10.8 | 8.4 | 8.0 | 11.3 | 11.8 | 9.6 | 7.3 | 6.7 | 5.8 | 9.0 | 9.1 | 7.2 |
| 3 | 11.5 | 9.3 | 9.1 | 12.4 | 13.2 | 11.0 | 7.6 | 7.0 | 6.1 | 9.2 | 9.4 | 7.6 |
| 4 | 11.8 | 10.6 | 9.4 | 13.2 | 14.0 | 11.8 | 7.7 | 7.0 | 6.5 | 9.3 | 9.6 | 7.9 |
| 5 | 12.7 | 11.3 | 10.2 | 14.0 | 14.9 | 13.4 | 7.8 | 7.1 | 6.5 | 9.6 | 9.7 | 7.8 |
| 6 | | | | | | | 8.2 | 7.5 | 6.9 | 9.9 | 10.1 | 8.2 |
| 7 | | | | | | | 8.3 | 7.5 | 7.0 | 10.2 | 10.3 | 8.4 |
| 8 | | | | | | | 8.6 | 7.7 | 7.3 | 10.6 | 10.9 | 8.8 |
| 9 | | | | | | | 8.6 | 7.6 | 7.1 | 10.5 | 11.0 | 8.9 |
| 10 | | | | | | | 8.8 | 8.3 | 7.2 | 10.8 | 11.1 | 9.0 |
| 11 | | | | | | | 9.2 | 8.6 | 7.9 | 11.0 | 11.7 | 9.5 |
| 12 | | | | | | | 9.4 | 8.5 | 7.9 | 11.3 | 11.8 | 9.7 |
| 13 | | | | | | | 9.6 | 9.0 | 8.4 | 11.7 | 12.1 | 10.1 |
| 14 | | | | | | | 9.7 | 9.2 | 8.4 | 11.8 | 12.3 | 10.3 |
| 15 | | | | | | | 10.0 | 9.3 | 8.5 | 12.2 | 12.7 | 10.1 |
| 16 | | | | | | | 10.1 | 9.4 | 8.7 | 12.0 | 12.4 | 10.2 |
| 17 | | | | | | | 10.2 | 9.3 | 8.9 | 12.3 | 12.8 | 10.4 |
| 18 | | | | | | | 10.5 | 9.6 | 9.0 | 12.6 | 13.1 | 10.9 |
| 19 | | | | | | | 10.6 | 9.9 | 9.1 | 12.8 | 13.1 | 11.0 |
| 20 | | | | | | | 10.9 | 9.7 | 9.2 | 12.8 | 13.1 | 11.1 |
| Δ between initial and final application | 4.9 | 5.6 | 4.7 | 6.2 | 6.9 | 6.4 | 4.1 | 4.2 | 3.8 | 5.0 | 5.3 | 4.3 |

The rule of thumb is that a trained operator can visually detect a change in the gloss of 3 points or more while the average person can visually detect a change in the gloss of 5 points or more. Tables 4 and 5 show that any change in the gloss of the tile over all of the successive applications was insignificant and visually imperceptible to either a trained or an untrained observer. Tables 8 and 9 show the results for the competitor's product, which increases the gloss when used at the higher recommended concentration when compared against the corresponding inventive formula. Additionally, the gloss increase caused by the competitor's product is easily visible when used at the higher recommended concentration.

Example 3

Example 3 evaluated the change in the gloss on sheet vinyl material after successive applications of the two formulas listed in Table 10.

TABLE 10

| Material | Formula A (in wt. %) | Formula B (in wt. %) |
|---|---|---|
| Water, DI | 99.208% | 99.869% |
| diethylene glycol monoethyl ether | 0.062% | 0.010% |
| dihexylene glycol monoethyl ether | 0.008% | 0.001% |

TABLE 10-continued

| Material | Formula A (in wt. %) | Formula B (in wt. %) |
|---|---|---|
| branched $C_{10}$ 5EO alcohol ethoxylate | 0.234% | 0.039% |
| polydimethyl siloxane (10% sol) | 0.019% | 0.003% |
| anionic fluorosurfactant (10%) | 0.014% | 0.002% |
| styrene acrylic polymer | 0.399% | 0.067% |
| oxidized polyethylene wax | 0.056% | 0.009% |

Two different samples of sheet vinyl flooring, Johnsonite Melodia Quartz and Mannington Biospec Bright White, were first scratched using a weighted green scouring pad and 30 passes on a Gardner Straight Line Abrasion instrument. A commercially available competitor's product was diluted at 2 oz/gal and 13 oz/gal as per the manufacturer's label instructions, and tested on the Johnsonite Melodia Quartz for comparison. The scratched sheet vinyl was then treated by applying a line of the liquid use-solution product onto the tile using a disposable pipette and spreading with a microfiber floor finish applicator pad. The composition was allowed to dry and then the gloss of the tile was measured with an industry-standard gloss meter such as the microTRI-gloss from Byk. Gloss measurements were taken at 20 degrees and 60 degrees. Additional layers of composition were applied to the tile on top of the previous layers, again by spreading the composition onto the tile with a microfiber finish applicator pad. The new composition was allowed to dry and then additional gloss measurements were taken. This process was repeated for a total of 5 applications of the more concentrated solutions or 20 applications of the more dilute solutions. The results are recorded in Tables 11 and 12.

TABLE 11

| Application | Formula A Gloss at 20° | | Formula A Gloss at 60° | | Formula B Gloss at 20° | | Formula B Gloss at 60° | |
|---|---|---|---|---|---|---|---|---|
| | Melodia Quartz | Biospec Bright White | Melodia Quartz | Biospec Bright White | Melodia Quartz | Biospec Bright White | Melodia Quartz | Biospec Bright White |
| Initial | 2.4 | 2.6 | 14.2 | 17.9 | 2.4 | 2.5 | 14.0 | 17.3 |
| 1 | 2.7 | 2.9 | 15.3 | 18.6 | 2.7 | 2.7 | 14.3 | 16.2 |
| 2 | 2.5 | 2.7 | 14.8 | 18.1 | 2.5 | 2.3 | 14.2 | 16.1 |
| 3 | 2.4 | 2.6 | 14.6 | 17.7 | 2.4 | 2.4 | 13.6 | 16.2 |
| 4 | 2.5 | 2.7 | 14.8 | 18.2 | 2.3 | 2.4 | 13.4 | 16.4 |
| 5 | 2.4 | 2.7 | 14.0 | 18.1 | 2.3 | 2.4 | 13.3 | 16.9 |
| 6 | | | | | 2.2 | 2.3 | 12.9 | 15.9 |
| 7 | | | | | 2.2 | 2.3 | 13.3 | 15.9 |
| 8 | | | | | 2.2 | 2.3 | 12.9 | 15.9 |
| 9 | | | | | 2.2 | 2.3 | 12.8 | 15.5 |
| 10 | | | | | 2.2 | 2.3 | 13.1 | 15.3 |
| 11 | | | | | 2.1 | 2.3 | 12.2 | 15.5 |
| 12 | | | | | 2.1 | 2.3 | 12.5 | 15.6 |
| 13 | | | | | 2.0 | 2.3 | 11.8 | 15.4 |
| 14 | | | | | 2.0 | 2.3 | 11.5 | 14.8 |
| 15 | | | | | 2.0 | 2.1 | 11.7 | 13.8 |
| 16 | | | | | 1.9 | 2.1 | 11.3 | 14.0 |
| 17 | | | | | 1.9 | 2.1 | 11.4 | 14.1 |
| 18 | | | | | 2.0 | 2.1 | 11.5 | 14.1 |
| 19 | | | | | 2.0 | 2.2 | 11.9 | 14.4 |
| 20 | | | | | 2.0 | 2.2 | 11.8 | 14.6 |
| Δ between initial and final application | 0.0 | 0.1 | −0.2 | 0.2 | −0.4 | −0.3 | −2.2 | −2.7 |

TABLE 12

| Application | Competitor Product 13 oz/gal Gloss at 20° Biospec Bright White | Competitor Product 13 oz/gal Gloss at 60° Biospec Bright White | Competitor Product 2 oz/gal Gloss at 20° Biospec Bright White | Competitor Product 2 oz/gal Gloss at 60° Biospec Bright White |
|---|---|---|---|---|
| Initial | 2.3 | 16.2 | 2.4 | 17.3 |
| 1 | 2.5 | 17.2 | 2.5 | 17.0 |
| 2 | 2.5 | 17.4 | 2.5 | 17.6 |
| 3 | 2.5 | 17.5 | 2.5 | 17.3 |
| 4 | 2.8 | 19.2 | 2.4 | 16.8 |
| 5 | 2.9 | 19.5 | 2.5 | 17.1 |
| 6 | | | 2.5 | 17.1 |
| 7 | | | 2.5 | 17.2 |
| 8 | | | 2.5 | 16.9 |
| 9 | | | 2.5 | 17.3 |
| 10 | | | 2.4 | 17.4 |
| 11 | | | 2.4 | 16.3 |
| 12 | | | 2.5 | 17.4 |
| 13 | | | 2.5 | 16.8 |
| 14 | | | 2.5 | 17.1 |
| 15 | | | 2.4 | 17.0 |
| 16 | | | 2.4 | 17.0 |
| 17 | | | 2.4 | 17.0 |
| 18 | | | 2.5 | 17.0 |
| 19 | | | 2.5 | 16.9 |
| 20 | | | 2.4 | 16.8 |
| Δ between initial and final application | 0.6 | 3.3 | −0.0 | −0.5 |

The rule of thumb is that a trained operator can visually detect a change in the gloss of 3 points or more while the average person can visually detect a change in the gloss of 5 points or more. Table 11 shows that any change in the gloss of the tile over all of the successive applications was insignificant and visually imperceptible to either a trained or an untrained observer. Table 12 shows the results for the competitor's product, which increases the gloss when used at the higher recommended concentration when compared against the corresponding inventive formula. Additionally, the gloss increase caused by the competitor's product is easily visible.

Example 4

Example 4 evaluated the change in the gloss on rubber flooring after successive applications of the two formulas listed in Table 13, and tested against a commercially available competitor's product.

TABLE 13

| Material | Formula A (in wt. %) | Formula B (in wt. %) |
|---|---|---|
| Water, DI | 99.208% | 99.869% |
| diethylene glycol monoethyl ether | 0.062% | 0.010% |
| dihexylene glycol monoethyl ether | 0.008% | 0.001% |
| branched $C_{10}$ 5EO alcohol ethoxylate | 0.234% | 0.039% |
| polydimethyl siloxane (10% sol) | 0.019% | 0.003% |
| anionic fluorosurfactant (10%) | 0.014% | 0.002% |
| styrene acrylic polymer | 0.399% | 0.067% |
| oxidized polyethylene wax | 0.056% | 0.009% |

Two different samples of Nora rubber flooring, Norament Hammered Dust Grey and Noraplan Valua Charboal, were first scratched using a weighted green scouring pad and either 10 or 20 passes on a Gardner Straight Line Abrasion instrument. The competitor's product was diluted at 2 oz/gal and 13 oz/gal as per the manufacturer's label instructions. The scratched linoleum was then treated by applying a line of the liquid use-solution product onto the tile using a disposable pipette and spreading with a microfiber floor finish applicator pad. The composition was allowed to dry and then the gloss of the tile was measured with an industry-standard gloss meter such as the micro-TRI-gloss from Byk. Gloss measurements were taken at degrees and 60 degrees. Additional layers of composition were applied to the tile on top of the previous layers, again by spreading the composition onto the tile with a microfiber finish applicator pad. The new composition was allowed to dry and then additional gloss measurements were taken. This process was repeated for a total of 5 applications of the more concentrated solutions or 20 applications of the more dilute solutions. The results are recorded in Tables 14 and 15.

TABLE 14

| | Formula A Gloss at 20° | | Formula A Gloss at 60° | | Formula B Gloss at 20° | | Formula B Gloss at 60° | |
| --- | --- | --- | --- | --- | --- | --- | --- | --- |
| Application | Norament Hammered Dust Grey | Noraplan Valua Charcoal | Norament Hammered Dust Grey | Noraplan Valua Charcoal | Norament Hammered Dust Grey | Noraplan Valua Charcoal | Norament Hammered Dust Grey | Noraplan Valua Charcoal |
| Initial | 1.5 | 1.0 | 14.7 | 10.2 | 1.5 | 1.0 | 15.2 | 10.5 |
| 1 | 2.4 | 1.2 | 19.0 | 9.9 | 2.1 | 1.1 | 18.0 | 9.4 |
| 2 | 2.7 | 1.1 | 22.6 | 10.3 | 2.1 | 1.1 | 17.5 | 9.5 |
| 3 | 2.8 | 1.1 | 25.0 | 10.2 | 2.2 | 1.0 | 18.2 | 9.4 |
| 4 | 3.2 | 1.1 | 24.5 | 10.6 | 2.3 | 1.0 | 18.3 | 9.2 |
| 5 | 3.2 | 1.2 | 24.4 | 11.6 | 2.3 | 1.1 | 18.4 | 9.3 |
| 6 | | | | | 2.7 | 1.1 | 21.7 | 9.1 |
| 7 | | | | | 2.6 | 1.0 | 19.9 | 9.1 |
| 8 | | | | | 2.7 | 1.0 | 21.4 | 8.9 |
| 9 | | | | | 2.9 | 1.0 | 23.7 | 9.0 |
| 10 | | | | | 2.5 | 1.0 | 19.4 | 8.8 |
| 11 | | | | | 2.7 | 1.0 | 20.4 | 8.8 |
| 12 | | | | | 2.3 | 1.0 | 18.1 | 9.1 |
| 13 | | | | | 2.6 | 1.1 | 20.5 | 9.2 |
| 14 | | | | | 2.6 | 1.1 | 19.9 | 9.2 |
| 15 | | | | | 2.0 | 1.0 | 16.2 | 9.0 |
| 16 | | | | | 2.3 | 1.1 | 18.7 | 9.1 |
| 17 | | | | | 2.5 | 1.1 | 18.3 | 9.3 |
| 18 | | | | | 2.3 | 1.1 | 18.0 | 9.5 |
| 19 | | | | | 2.6 | 1.1 | 20.0 | 9.4 |
| 20 | | | | | 2.8 | 1.1 | 21.8 | 9.3 |
| Δ between initial and final application | 1.7 | 0.2 | 9.7 | 1.4 | 1.3 | 0.1 | 6.6 | −0.8 |

TABLE 15

| | Competitor Product 13 oz/gal Gloss at 20° | | Competitor Product 13 oz/gal Gloss at 60° | | Competitor Product 2 oz/gal Gloss at 20° | | Competitor Product 2 oz/gal Gloss at 60° | |
| --- | --- | --- | --- | --- | --- | --- | --- | --- |
| Application | Norament Hammered Dust Grey | Noraplan Valua Charcoal | Norament Hammered Dust Grey | Noraplan Valua Charcoal | Norament Hammered Dust Grey | Noraplan Valua Charcoal | Norament Hammered Dust Grey | Noraplan Valua Charcoal |
| Initial | 1.9 | 1.1 | 17.6 | 10.7 | 1.5 | 1.2 | 15.1 | 10.9 |
| 1 | 3.0 | 1.1 | 24.9 | 10.3 | 2.1 | 1.1 | 18.7 | 9.8 |
| 2 | 3.6 | 1.3 | 27.2 | 12.6 | 2.1 | 1.1 | 18.3 | 9.9 |
| 3 | 3.9 | 1.5 | 28.9 | 14.1 | 2.1 | 1.1 | 18.4 | 10.3 |
| 4 | 4.3 | 1.8 | 30.3 | 16.4 | 2.2 | 1.2 | 17.9 | 10.7 |
| 5 | 4.7 | 2.1 | 31.5 | 18.4 | 1.9 | 1.1 | 18.0 | 10.9 |
| 6 | | | | | 2.1 | 1.2 | 17.4 | 11.3 |
| 7 | | | | | 2.0 | 1.2 | 16.8 | 11.3 |
| 8 | | | | | 1.8 | 1.3 | 15.6 | 11.8 |
| 9 | | | | | 1.8 | 1.4 | 16.2 | 11.9 |
| 10 | | | | | 1.9 | 1.4 | 16.1 | 12.0 |
| 11 | | | | | 1.9 | 1.5 | 15.8 | 12.2 |
| 12 | | | | | 1.8 | 1.5 | 15.7 | 12.5 |
| 13 | | | | | 1.9 | 1.5 | 16.3 | 12.4 |
| 14 | | | | | 1.8 | 1.6 | 15.4 | 12.6 |
| 15 | | | | | 2.0 | 1.9 | 16.3 | 12.5 |
| 16 | | | | | 1.8 | 1.6 | 15.9 | 12.4 |
| 17 | | | | | 1.8 | 1.6 | 15.7 | 12.7 |
| 18 | | | | | 1.7 | 1.6 | 14.4 | 12.5 |
| 19 | | | | | 1.7 | 1.6 | 16.4 | 12.1 |
| 20 | | | | | 1.8 | 1.6 | 14.7 | 12.5 |
| Δ between initial and final application | 2.8 | 1.0 | 13.9 | 7.7 | 0.3 | 0.4 | −0.4 | 1.6 |

The rule of thumb is that a trained operator can visually detect a change in the gloss of 3 points or more while the average person can visually detect a change in the gloss of 5 points or more. Table 14 shows that repeated product use on the Norament Hammered Dust Grey will build some gloss when measured at 60°. However, Table 15 shows that repeated use of the competitive product at the comparable higher dilution ratio will build even more gloss when measured at 60°.

Example 5

Example 5 examined the adhesion of the composition to the floor tile. The formulas used for Example 5 are set forth in Table 16 below:

TABLE 16

| Material | Formula A (in wt. %) | Formula C (in wt. %) | Formula D (in wt. %) | Formula E (in wt. %) |
| --- | --- | --- | --- | --- |
| Water, DI | 91.54% | 91.42% | 91.54% | 91.54% |
| Dietheylene Glycol Monoethyl Ether | 0.66% | 0.66% | 0.66% | 0.66% |
| Dihexylene Glycol Monoethyl Ether | 0.09% | 0.09% | 0.09% | 0.09% |
| Branched C10 5EO Alcohol Ethoxylate | 2.50% | 0.50% | 0.00% | 0.00% |
| Branched C10 4EO Alcohol Ethoxylate | 0.00% | 0.00% | 0.50% | 2.50% |
| block polyoxypropylene-polyoxyethylene polymer | 0.00% | 2.12% | 0.00% | 0.00% |
| fatty alcohol polyoxypropylene-polyoxyethylene | 0.00% | 0.00% | 2.00% | 0.00% |
| Polydimethyl siloxane (10% sol) | 0.20% | 0.20% | 0.20% | 0.20% |
| Anionic fluorosurfactant (10%) | 0.15% | 0.15% | 0.15% | 0.15% |
| Styrene acrylic polymer | 4.26% | 4.26% | 4.26% | 4.26% |
| Oxidized polyethylene wax | 0.60% | 0.60% | 0.60% | 0.60% |

The adhesion test was performed on two luxury vinyl tile samples: Armstrong Natural Creations Fruitwood Alabaster (white in color) and Centiva Starnet (dark grey in color). According to ASTM D3359, the cured coating was cut/scored in a cross-hatch pattern using the multipladed scoring tool, tape was applied to scored area, and the tape quickly pulled off the tile. Adhesion of the composition to the floor was visually rated on a scale of 0-5, according to how much coating was removed by the tape, with a rating of 5 being perfect adhesion resulting from no coating loss, a rating of 4 being less than 5% coating loss, and a rating of 3 being 5-15% coating loss. The test was run with the flooring dry, and with water allowed to sit on the floor both before and after scoring the floor. The results are shown in Table 17.

TABLE 17

| | Amstrong Natural Creations Fruitwood Alibaster | | | Centiva Starnet | | |
| --- | --- | --- | --- | --- | --- | --- |
| | Dry | Cut then Wet | Wet then Cut | Dry | Cut then Wet | Wet then Cut |
| Formula A | 5B | 3B | 5B | 5B | 5B | 5B |
| Formula C | 3B | 0B | 2B | 5B | 5B | 5B |
| Formula D | 4B | 1B | 0B | 5B | 5B | 5B |
| Formula E | 5B | 3B | 0B | 5B | 5B | 5B |

Table 17 shows that the invention will adhere to luxury vinyl in a manner that is considered comparable to what is required for when floor finish is applied to a floor. It is well known by those skilled in the art that films applied to flooring substrates are often partially, if not completely, removed when tested under wet conditions particularly coatings that are not considered to be semi-permanent or permanent.

Example 6

Example 6 determined the adhesion performance of the formula listed in Table 18 on linoleum, rubber, and sheet vinyl compared against a competitive product currently available on the market.

TABLE 18

| Material | Formula A (in wt. %) |
| --- | --- |
| Water, DI | 91.54% |
| diethylene glycol monoethyl ether | 0.66% |
| dihexylene glycol monoethyl ether | 0.09% |
| branched $C_{10}$ 5EO alcohol ethoxylate | 2.50% |
| polydimethyl siloxane (10% sol) | 0.20% |
| anionic fluorosurfactant (10%) | 0.15% |
| styrene acrylic polymer | 4.26% |
| oxidized polyethylene wax | 0.60% |

6"×6" samples of each flooring substrate were treated with the test solution applied at a rate of 2 g product per 1 sq. ft. of flooring. The test solutions were applied 5 times to ensure enough material was left on the flooring to enable the test. After the 5$^{th}$ application, the flooring was allowed to cure for 1 week prior to testing. The testing was performed on 3 samples of NORA Rubber: Noraplan Valua, Norament Hammered, and Norament Grano. The testing was also performed on two samples of sheet vinyl: Johnsonite Melodia Quartz and Mannington Biospec Bright White. Additionally, the testing was performed on 6 samples of Forbo linoleum: Modular T3233, MCT-621, Concrete 3707, Real 3136, Piano 3629, and Striato 5216.

According to ASTM D3359, the cured coating was cut/scored in a cross-hatch pattern using the multipladed scoring tool, tape was applied to scored area, and the tape quickly pulled off the tile. Adhesion of the composition to the floor was visually rated on a scale of 0-5, according to how much coating was removed by the tape, with a rating of 5 being perfect adhesion resulting from no coating loss, a rating of 4 being less than 5% coating loss, and a rating of 3 being 5-15% coating loss. The test was run with the flooring dry, and with water allowed to sit on the floor both before and after scoring the floor. The results are shown in Table 19.

TABLE 19

| | Formula | | | Competitive Product A | | |
|---|---|---|---|---|---|---|
| | Dry | Cut then Wet | Wet then Cut | Dry | Cut then Wet | Wet then Cut |
| Noraplan Valua | 5B | 0B | 0B | 0B | 0B | 0B |
| Norment Hammered | 0B | 0B | 0B | 0B | 0B | 0B |
| Norament Grano | 0B | 0B | 0B | 0B | 0B | 0B |
| Mannington Biospec | 5B | 5B | 5B | 5B | 0B | 0B |
| Johnsonite Melodia | 5B | 5B | 5B | Not tested | Not tested | Not tested |
| Modular T3233 | 5B | 5B | 5B | 0B | 0B | 0B |
| MCT-621 | 5B | 5B | 5B | 0B | 0B | 0B |
| Concrete 3707 | 5B | 5B | 4.5B | 3.3B | 0B | 0B |
| Real 3136 | 5B | 5B | 5B | 0B | 0B | 0B |
| Piano 3629 | 5B | 5B | 5B | 4B | 0B | 0B |
| Striato 5216 | 5B | 0.3B | 0.5B | 0B | 0B | 0B |

Table 19 shows that the invention will adhere to sheet vinyl, linoleum and some rubber flooring in a manner that is considered comparable to what is required for when floor finish is applied to a floor, whereas current product available on the market will not. It is well known by those skilled in the art that films applied to flooring substrates are often partially, if not completely, removed when tested under wet conditions particularly coatings that are not considered to be semi-permanent or permanent.

Example 7

Example 7 determined the contact angle for the formulas in Example 5. The contact angle was determined by measuring the angle at the intersection of a droplet of the cleaning solution with the tile surface using a FTA200 Contact Angle Goniometer with Drop Shape Analysis software. The experimental formulas were tested against HP Neutral, which is a high performance neutral floor cleaner commercially available from Ecolab Inc. (St. Paul, Minn.). The results are shown in Table 20.

TABLE 20

| | Contact Angle | | | | | |
|---|---|---|---|---|---|---|
| | Initial | 1 sec | 6 secs | 11 secs | 16 secs | 21 secs |
| HP Neutral | 38.98 | 38.66 | 38.5 | 38.34 | 38.38 | 37.27 |
| Formula E | 37.62 | 36.49 | 37.35 | 35.67 | 36.49 | 35.72 |
| Formula A | 39.52 | 39.32 | 38.19 | 38.88 | 38.67 | 38.25 |
| Formula D | 38.07 | 38.07 | 36.26 | 36.07 | 36.03 | 36.25 |
| Formula C | 42.97 | 43.15 | 43.75 | 43.55 | 43.15 | 42.97 |

Table 20 shows that the invention will effectively wet out a surface comparable to, if not better than, an established floor cleaner. The rule of thumb is that a measured contact angle of less than 90° indicates the solution effectively wets the surface, and a difference of more than 5 degrees in the measured contact angle is considered significantly different to indicate real and observable differences in wetting.

Example 8

Example 8 determined the percent reflectance change. Percent reflectance change is an indicator of how much soil was removed; the higher the value, the better the soil removal and cleaning performance. The percent reflectance change was determined by comparing the composite color number of L* as measured by a Hunter MiniScan instrument of the tiles from before and after cleaning. The tested formulas were compared against plain water, as a blank, and against HP Neutral, a commercially available high performance neutral floor cleaner. The formulas tested are listed in Table 21 below:

TABLE 21

| Material | Formula A (in wt. %) | Formula B (in wt. %) | Formula F (in wt. %) | Formula G (in wt. %) | Formula H (in wt. %) |
|---|---|---|---|---|---|
| Water, DI | 91.54% | 89.04% | 91.54% | 89.04% | 89.04% |
| diethylene glycol monoethyl ether | 0.66% | 0.66% | 0.66% | 0.66% | 0.66% |
| dihexylene glycol monoethyl ether | 0.09% | 0.09% | 0.09% | 0.09% | 0.09% |
| branched $C_{10}$ 5EO alcohol ethoxylate | 2.50% | 5.00% | 1.25% | 1.00% | 2.00% |
| fatty alcohol polyoxypropylene-polyoxyethylene | 0.00% | 0.00% | 1.25% | 4.00% | 3.00% |
| polydimethyl siloxane (10% sol) | 0.20% | 0.20% | 0.20% | 0.20% | 0.20% |
| anionic fluorosurfactant (10%) | 0.15% | 0.15% | 0.15% | 0.15% | 0.15% |
| styrene acrylic polymer | 4.26% | 4.26% | 4.26% | 4.26% | 4.26% |
| oxidized polyethylene wax | 0.60% | 0.60% | 0.60% | 0.60% | 0.60% |

TABLE 22

| Products | Tile No. | Cleaned Reading | St. Dev. | Percent Reflectance Change | Avg % Reflectance Change | Avg % Reflectance Change Stdv |
|---|---|---|---|---|---|---|
| Water | 1 | 38.42 | 0.71 | 29.76 | 29.69 | 0.10 |
| Water | 2 | 38.33 | 0.20 | 29.62 | | |
| Formula H | 3 | 38.36 | 0.21 | 29.67 | 29.21 | 0.65 |
| Formula H | 4 | 37.76 | 0.15 | 28.74 | | |
| Formula F | 5 | 38.84 | 0.25 | 30.40 | 30.13 | 0.39 |
| Formula F | 6 | 38.48 | 0.51 | 29.85 | | |
| Formula G | 7 | 39.99 | 0.48 | 32.17 | 32.25 | 0.11 |
| Formula G | 8 | 40.09 | 0.15 | 32.32 | | |
| Formula A | 9 | 39.01 | 0.64 | 30.67 | 30.69 | 0.03 |
| Formula A | 10 | 39.04 | 0.49 | 30.71 | | |
| Formula B | 11 | 39.11 | 0.17 | 30.82 | 30.09 | 1.03 |
| Formula B | 12 | 38.16 | 0.30 | 29.36 | | |
| HP Neutral | 13 | 39.13 | 0.37 | 30.85 | 30.79 | 0.09 |
| HP Neutral | 14 | 39.05 | 0.34 | 30.73 | | |
| Formula G | 15 | 39.57 | 0.14 | 31.53 | 30.63 | 1.27 |
| Formula G | 16 | 38.40 | 0.14 | 29.73 | | |
| Formula H | 17 | 38.82 | 0.80 | 30.37 | 31.30 | 1.30 |
| Formula H | 18 | 40.02 | 0.63 | 32.22 | | |
| Water | 19 | 36.27 | 0.88 | 26.46 | 26.72 | 0.38 |

TABLE 23

| Products | Tile No. | Cleaned Reading | St. Dev. | Percent Reflectance Change | Avg % Reflectance Change | Avg % Reflectance Change Stdv |
|---|---|---|---|---|---|---|
| HP Neutral | 3 | 37.25 | 0.22 | 28.02 | 27.46 | 0.79 |
| HP Neutral | 4 | 36.52 | 0.22 | 26.90 | | |
| HP Neutral | 5 | 38.15 | 0.23 | 29.40 | 29.40 | 0.00 |
| HP Neutral | 6 | 38.15 | 0.56 | 29.40 | | |
| Formula A | 7 | 38.24 | 0.41 | 29.54 | 28.67 | 1.24 |
| Formua A | 8 | 37.10 | 0.37 | 27.79 | | |
| Formula A | 9 | 36.45 | 0.18 | 26.79 | 28.60 | 2.56 |

TABLE 23-continued

| Products | Tile No. | Cleaned Reading | St. Dev. | Percent Reflectance Change | Avg % Reflectance Change | Avg % Reflectance Change Stdv |
|---|---|---|---|---|---|---|
| Formula A | 10 | 38.80 | 0.24 | 30.40 | | |
| Formula G | 11 | 39.72 | 0.47 | 31.82 | 29.98 | 2.60 |
| Formula G | 12 | 37.33 | 0.50 | 28.14 | | |
| Formula G | 13 | 38.10 | 0.49 | 29.33 | 29.70 | 0.52 |
| Formula G | 14 | 38.58 | 0.13 | 30.07 | | |
| Water | 15 | 37.53 | 0.27 | 28.45 | 26.95 | 2.12 |
| Water | 16 | 35.58 | 0.53 | 25.45 | | |
| Water | 17 | 34.19 | 0.53 | 23.31 | 24.88 | 2.22 |
| Water | 18 | 36.23 | 0.27 | 26.45 | | |

The results from Tables 22 and 23 show that the invention removes industry standard black soil significantly better than plain water, and comparable to an established neutral floor cleaner.

Example 9

Example 9 shows the removability of the invention when the flooring is cleaned with standard floor cleaners. The cleaners were applied to the tile for varying contact times, and the tile gently wiped with a paper towel to determine if any removal occurred. The results are listed in Table 24.

TABLE 24

| | Formula A | Formula C | Formula D | Formula E |
|---|---|---|---|---|
| Alkaline Cleaner - low dilution | Slight removal 5 min, Complete removal - 15 min | Complete removal - 1 min | Complete removal - 5 min | Slight removal - 5 min, Complete removal - 10 min |
| Alkaline Cleaner - high dilution | Slight removal 15 min, Complete Removal - 20 min | Complete removal - 1 min | Slight removal - 5 min, Complete removal 15 min | Slight removal - 15 min, Complete removal - 20 min |
| Neutral cleaner | No removal - 20 min | Slight removal - 1 min, Complete removal - 5 min | Slight removal - 5 min, Significant removal - 10 min, Complete removal - 30 min | |

The results from Table 24 show the ability to remove the invention from a floor using standard cleaner chemistry.

While certain embodiments of the disclosed composition and methods have been described, other embodiments may exist. While the specification includes a detailed description, the invention's scope is indicated by the following claims. Furthermore, while the specification has been described in language specific to structural features and/or methodological acts, the claims are not limited to the features or acts described above. Rather, the specific features and acts described above are disclosed as illustrative aspects and embodiments of the compositions and method. Various other aspects, embodiments, modifications, and equivalents thereof which, after reading the description herein, may suggest themselves to one of ordinary skill in the art without departing from the spirit of the invention or the scope of the claimed subject matter.

What is claimed is:

1. A floor care composition for flooring having a non-removable coating, the composition comprising:
    0.009 wt. % to 1.0 wt. % of a wax;
    about 0.2 to about 3 wt. % of a resin selected from a natural resin, a polymer having a molecular weight of about 500 to 2000, or combinations thereof;
    about 0.02 to about 1 wt. % a surfactant; and
    97 to 99.9 wt.% of a diluent.

2. The composition of claim 1, wherein the composition comprises about 0.1 to about 0.2 wt. % wax.

3. The composition of claim 1, wherein the wax is a polyethylene wax emulsion.

4. The composition of claim 1, wherein the resin is an acrylic copolymer emulsion.

5. The composition of claim 1, wherein the surfactant is an alcohol ethoxylate.

6. The composition of claim 1, wherein the diluent comprises at least one of organic solvent and water.

7. The composition of claim 6, wherein the organic solvent comprises glycol ether.

8. The composition of claim 1, wherein the surfactant acts as a plasticizer and the composition is free of other plasticizers.

9. The composition of claim 5, wherein the alcohol ethoxylate is present at an effective concentration to act as a plasticizer in an absence of other plasticizers.

10. The composition of claim 5, wherein the alcohol ethoxylate is a Guerbet alcohol.

11. The composition of claim 5, wherein the alcohol ethoxylate is a branched alcohol ethoxylate.

12. The composition of claim 1, wherein the composition further comprises about 0.005 to about 0.5 wt. % of a silicone emulsion.

13. The composition of claim 1, wherein the surfactant is a fluorosurfactant.

14. The composition of claim 1, wherein the composition is free of urethanes.

15. The composition of claim 1, further comprising a hydrotrope.

16. The composition of claim 15, wherein the hydrotrope comprises about 0.005 to about 7 wt. % of the composition.

17. The composition of claim 1, wherein the polymer is selected from one or more of acrylic polymers, styrene/acrylic polymers, polyester polymers, polyurethane polymers, polyether polymers, polyaldehyde polymers, polycarbonate polymers, and polyamide polymers.

* * * * *